United States Patent [19]
Irikura et al.

[11] Patent Number: 6,015,362
[45] Date of Patent: Jan. 18, 2000

[54] DIFFERENTIAL GEAR ASSEMBLY WITH DISC-SHAPED INPUT MEMBER

[75] Inventors: Koji Irikura, Kobe; Hirohiko Kawada, Amagasaki, both of Japan

[73] Assignee: Kanzaki Kokyukoki Mfg. Co., Ltd., Hyogo-ken, Japan

[21] Appl. No.: 08/841,831

[22] Filed: May 6, 1997

[51] Int. Cl.[7] ............................................. F16H 48/22
[52] U.S. Cl. ........................... 475/231; 475/233; 475/240
[58] Field of Search ................................... 475/230, 231, 475/233, 240, 241, 243, 336

[56] References Cited

U.S. PATENT DOCUMENTS

| | | | |
|---|---|---|---|
| 1,316,248 | 9/1919 | Latham | 475/230 X |
| 1,421,834 | 7/1922 | Ross | 475/230 |
| 1,802,545 | 4/1931 | Acker | 475/230 X |
| 2,354,214 | 7/1944 | Lockwood | 475/233 |
| 2,608,261 | 8/1952 | Blazier | 475/230 X |
| 3,523,467 | 8/1970 | Shachter | 475/240 X |
| 3,528,323 | 9/1970 | Kamlukin et al. | 475/235 |
| 3,724,289 | 4/1973 | Kennicutt | 475/88 |
| 3,779,102 | 12/1973 | Pfarrwaller | 475/244 |
| 4,182,201 | 1/1980 | Mayhew et al. | 475/230 |
| 4,232,569 | 11/1980 | Hauser et al. | 475/206 |
| 4,657,091 | 4/1987 | Morgan | 475/230 X |
| 4,809,560 | 3/1989 | Nemoto | 74/371 |
| 5,055,095 | 10/1991 | Osenbaugh et al. | 475/240 X |
| 5,098,355 | 3/1992 | Long | 475/230 X |
| 5,807,200 | 9/1998 | Hauser | 475/231 X |
| 5,897,452 | 4/1999 | Schreier et al. | |
| 5,899,826 | 5/1999 | Schreier et al. | |

FOREIGN PATENT DOCUMENTS

| | | |
|---|---|---|
| 1-169642 | 11/1989 | Japan . |
| 4-17541 | 2/1992 | Japan . |
| 7-34248 | 6/1995 | Japan . |
| 0695863 | 11/1979 | U.S.S.R. ................................. 475/241 |
| 144027 | 6/1920 | United Kingdom . |
| 2 254 665 | 10/1992 | United Kingdom . |

*Primary Examiner*—Charles A. Marmor
*Assistant Examiner*—Ankur Parekh
*Attorney, Agent, or Firm*—Larson & Taylor

[57] ABSTRACT

A differential gear assembly includes a disc-shaped input gear receiving drive force and having a central portion, an outer portion around the central portion, and one or more open space portions formed between the central portion and the outer portion. A pair of output shafts extend opposite each other along the axis of the input gear and one end of each of the output shafts is loosely fitted in a central bore formed in the central portion of the input gear. A pair of side bevel gears is provided each of which is fixedly attached near the end of each output shaft closer to the input gear. One or more support shafts extend radially from the central portion into the open space portions of the input gear. One or more bevel pinions is rotatably supported on the one or more support shafts, respectively, to mesh with the pair of side bevel gears. A friction mechanism is located in at least one of one or more open space portions that permits the bevel pinion to rotate with rotational resistance. With this construction, since it is possible to provide a limited slip effect without using a casing-shaped ring gear, the resulting assembly can be made compact and less costly.

11 Claims, 18 Drawing Sheets

F I G. 1
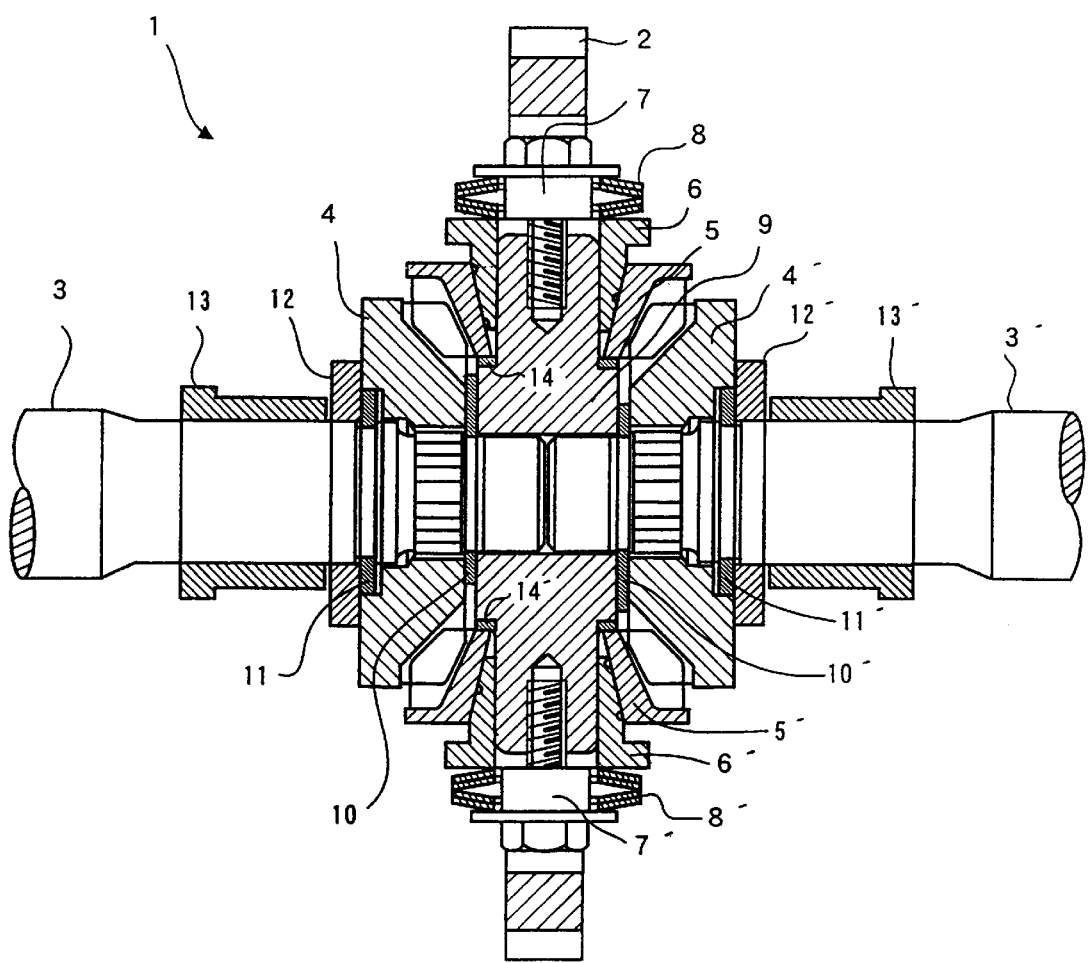

F I G. 2
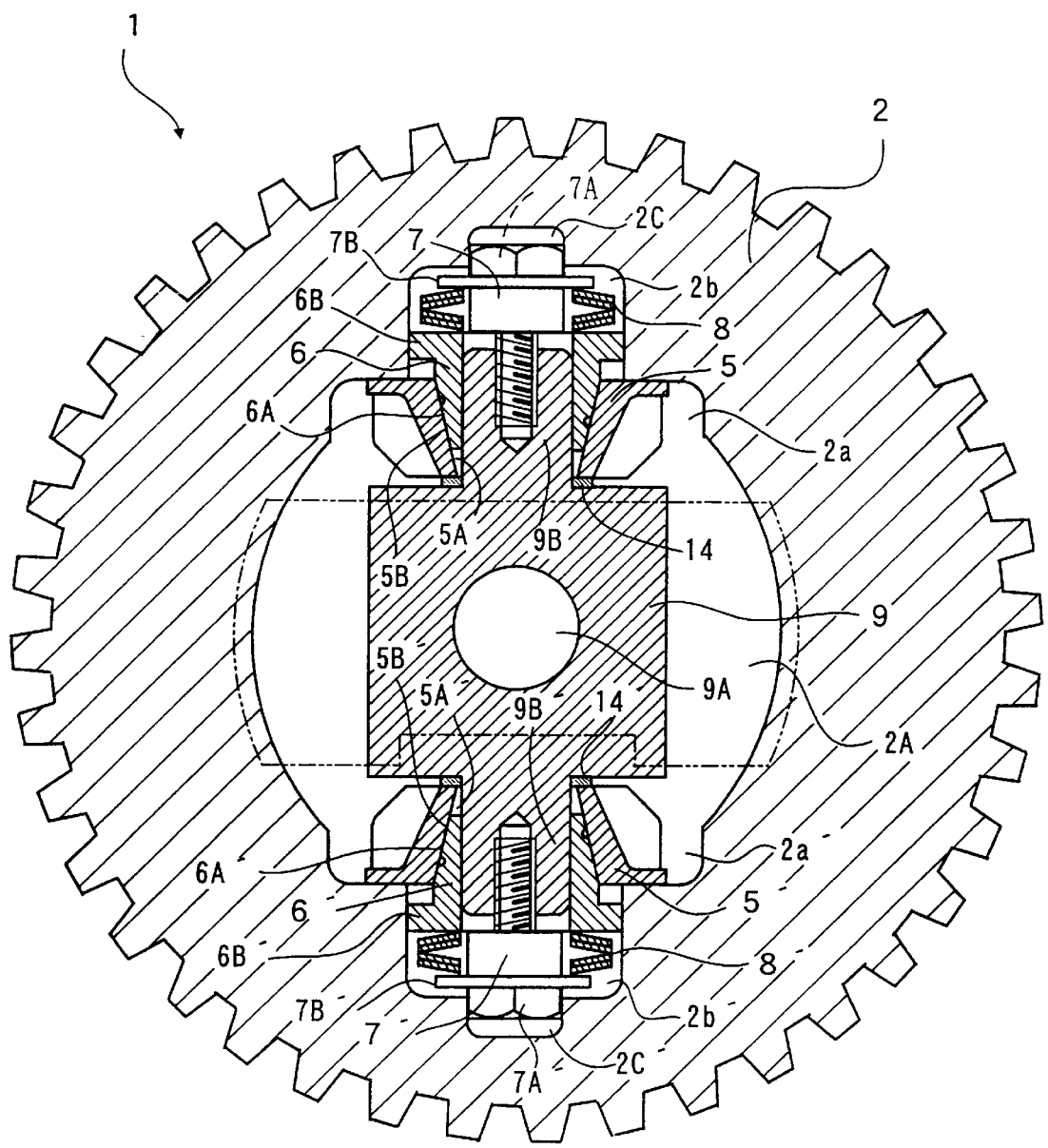

F I G. 6
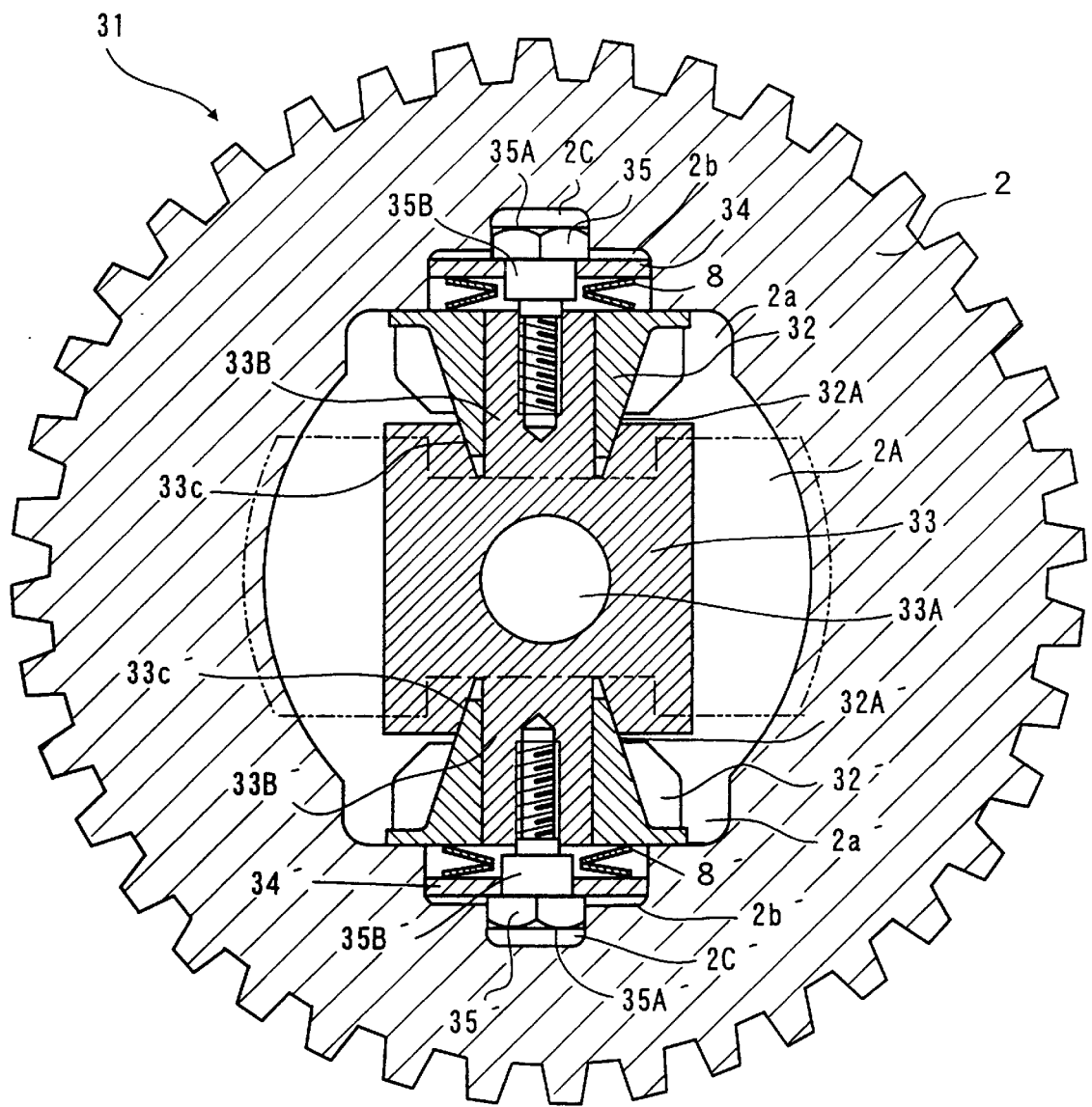

F I G. 1 6
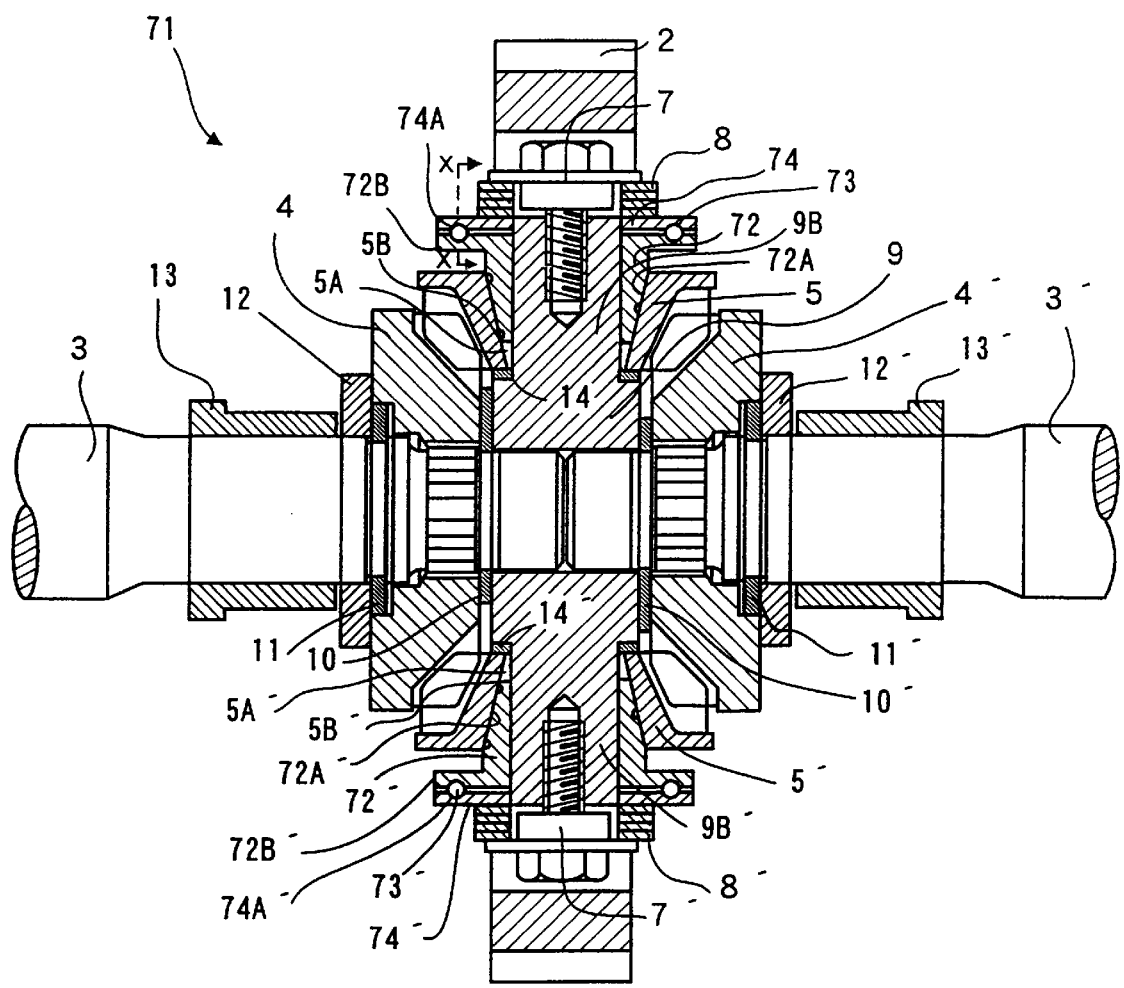

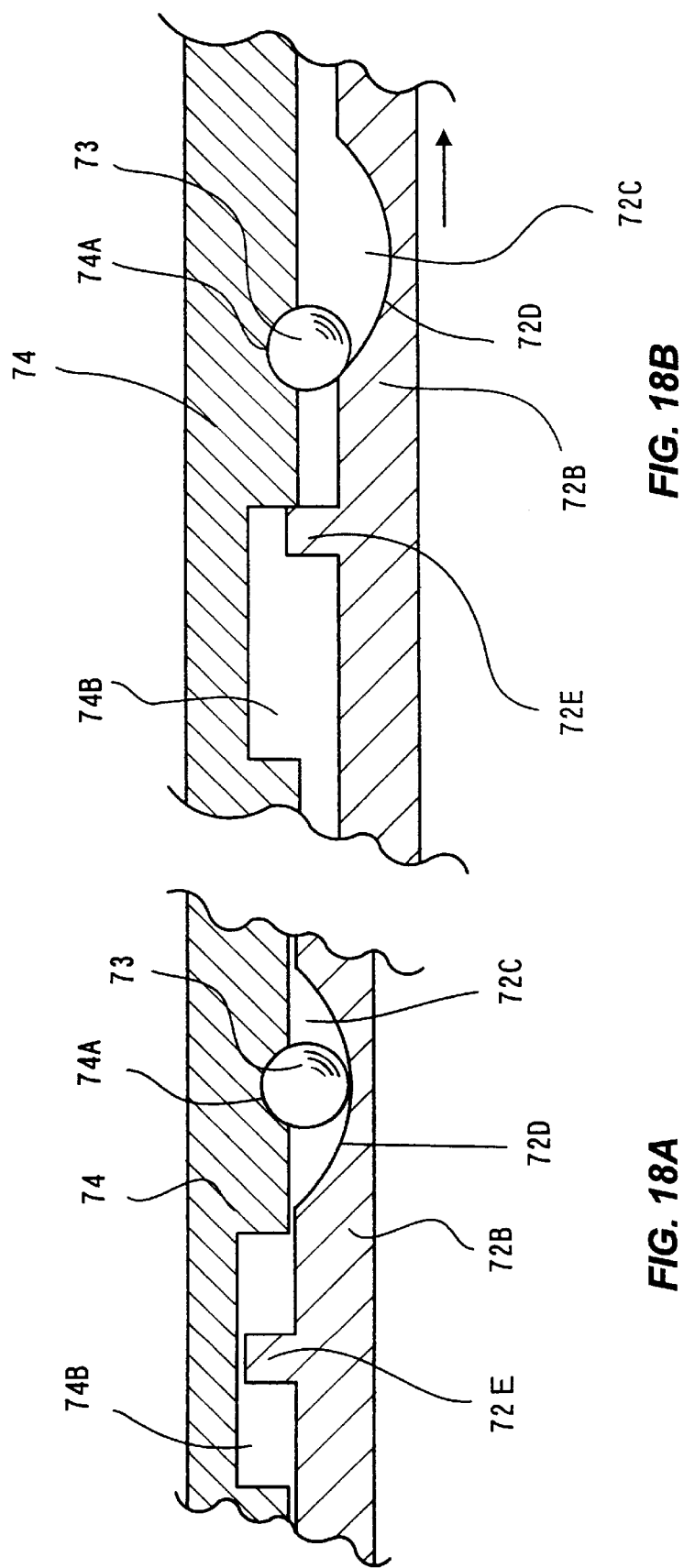

DIFFERENTIAL GEAR ASSEMBLY WITH DISC-SHAPED INPUT MEMBER

TECHNICAL FIELD

The present invention relates to a differential gear assembly for use in vehicles, and more particularly relates to a differential gear assembly having a limited slip mechanism for preventing drive power waste caused by undesirable spin of one of a pair of ground wheels of a vehicle. Such spin occurs when there exists an extreme imbalance in the external load applied on the pair of ground wheels connected to a common differential gear assembly.

BACKGROUND OF THE INVENTION

Many conventional differential gears employ a casing-shaped ring gear that accommodates and supports input and output bevel gears. As a result, the whole assembly is inevitably large-sized and heavy-weighed. To make the assembly compact, light weight and less costly, Japanese Unexamined Utility Model Publication No. 169642/1989 and U.S. Pat. No. 4,232,569, for example, have proposed differential gears having a simple disc-shaped ring gear with bevel gears being exposed from the ring gear.

However, these differential gears could not provide a limited slip effect. For example, when one ground wheel is stuck in muddy ground, most of the rotational force from the ring gear is wasted only to cause the stuck wheel to spin because little external load is applied on the stuck wheel. So, it was very difficult for a vehicle to escape from the muddy ground.

Japanese Unexamined Utility Model Publication Nos. 17541/1992 and 34248/1975 and U.S. Pat. No. 2,354,214, for example, have proposed differential gears that can provide a limited-slippage effect.

However, all of these differential gears employ a casing-shaped ring gear so that rotational resistance applied on the heavier load bearing wheel and its shaft is transmitted to the lighter load bearing wheel and its shaft via the ring gear to prevent spinning of the lighter load bearing wheel. The whole assembly is inevitably large-sized and complex, which results in an increased production cost.

SUMMARY OF THE INVENTION

The present invention was made to overcome the above problems, and the primary objection thereof is to provide a differential gear assembly that can provide a limited slip effect without using a casing-shaped ring gear while remaining compact and less costly.

In order to solve the above problem, the present invention provides a differential gear assembly comprising: a disc-shaped input gear receiving drive force and having a central portion, an outer portion around the central portion, and one or more open space portions formed between the central portion and the outer portion; a pair of output shafts extending opposite along the axis of the input gear and one end of each of the output shafts being loosely fitted in a central bore formed in the central portion of the input gear; a pair of side bevel gears each of which is fixedly attached near the end of each output shaft closer to the input gear; one or more support shafts extending radially from the central portion into the open space portions of the input gear; one or more bevel pinions rotatably supported on the one or more support shafts, respectively, to mesh with the pair of side bevel gears; and a friction mechanism located in at least one of said one or more open space portions that permits the bevel pinion to rotate with rotational resistance.

Further, the present invention provides a differential gear assembly comprising: a disc-shaped input gear receiving drive force and having a central member, an outer portion formed discrete from the central member therearound, and one or more open space portions formed between the central member and the outer portion; a pair of output shafts extending opposite along the axis of the input gear and one end of each of the output shafts being loosely fitted in a central bore formed in the central portion of the input gear; a pair of side bevel gears each of which is fixedly attached near the end of each output shaft closer to the input gear; one or more support shafts extending radially from the central member within the open space portion of the input gear; one or more bevel pinions rotatably supported on the one or more support shafts, respectively, to mesh with the pair of side bevel gears; and an end piece fixed on the support shaft; and a biasing member disposed between the bevel pinion and the end piece to push the bevel pinion against the central member, wherein the bevel pinion is provided with a first friction face of male coned shape tapering toward the center of the input gear, and wherein the central member is provided with a recess having on its circumferential surface a second friction face of female coned shape correspondingly tapering to frictionally engage the first friction face.

Still further, the present invention provides a differential gear assembly comprising: a disc-shaped input gear receiving drive force and having a central member, an outer portion formed discrete from the central member therearound, and one or more open space portions formed between the central member and the outer portion; a pair of output shafts extending opposite along the axis of the input gear and one end of each of the output shafts being loosely fit in a central bore formed in the central portion of the input gear; a pair of side bevel gears each of which is fixedly attached near the end of each output shaft closer to the input gear; one or more support shafts extending radially from the central member within the open space portion of the input gear; one or more bevel pinions rotatably supported on the one or more support shafts, respectively, to mesh with the pair of side bevel gears; and an end piece fixed on the support shaft; and a biasing member disposed between the bevel pinion and the end piece to push the bevel pinion against the central member, wherein a first friction face of female coned shape tapering radially outwardly of the input gear is formed in the hole through which the support shaft of the bevel pinion passes, and wherein the central member comprises a second friction face of male coned shape tapering to correspond with the first friction face for frictional engagement therewith.

BRIEF DESCRIPTION OF THE DRAWINGS

Other objects and advantages of the invention will be apparent from the following detailed description with reference to the accompanying drawings, in which:

FIG. 1 is a vertical longitudinal section of a first embodiment of differential gear assembly of the present invention;

FIG. 2 is a vertical transverse section of the differential gear assembly shown in FIG. 1;

FIG. 6 is a vertical transverse section of a third embodiment of differential gear assembly of the present invention;

FIG. 16 is a vertical longitudinal section of a seventh embodiment of differential gear assembly of the present invention;

FIGS. 18A and 18B are each a sectional view taken along line X—X in FIG. 16 with the friction members in different positions.

DETAILED DESCRIPTION OF THE PREFERRED EMBODIMENTS

Embodiment 1

Figure 3:
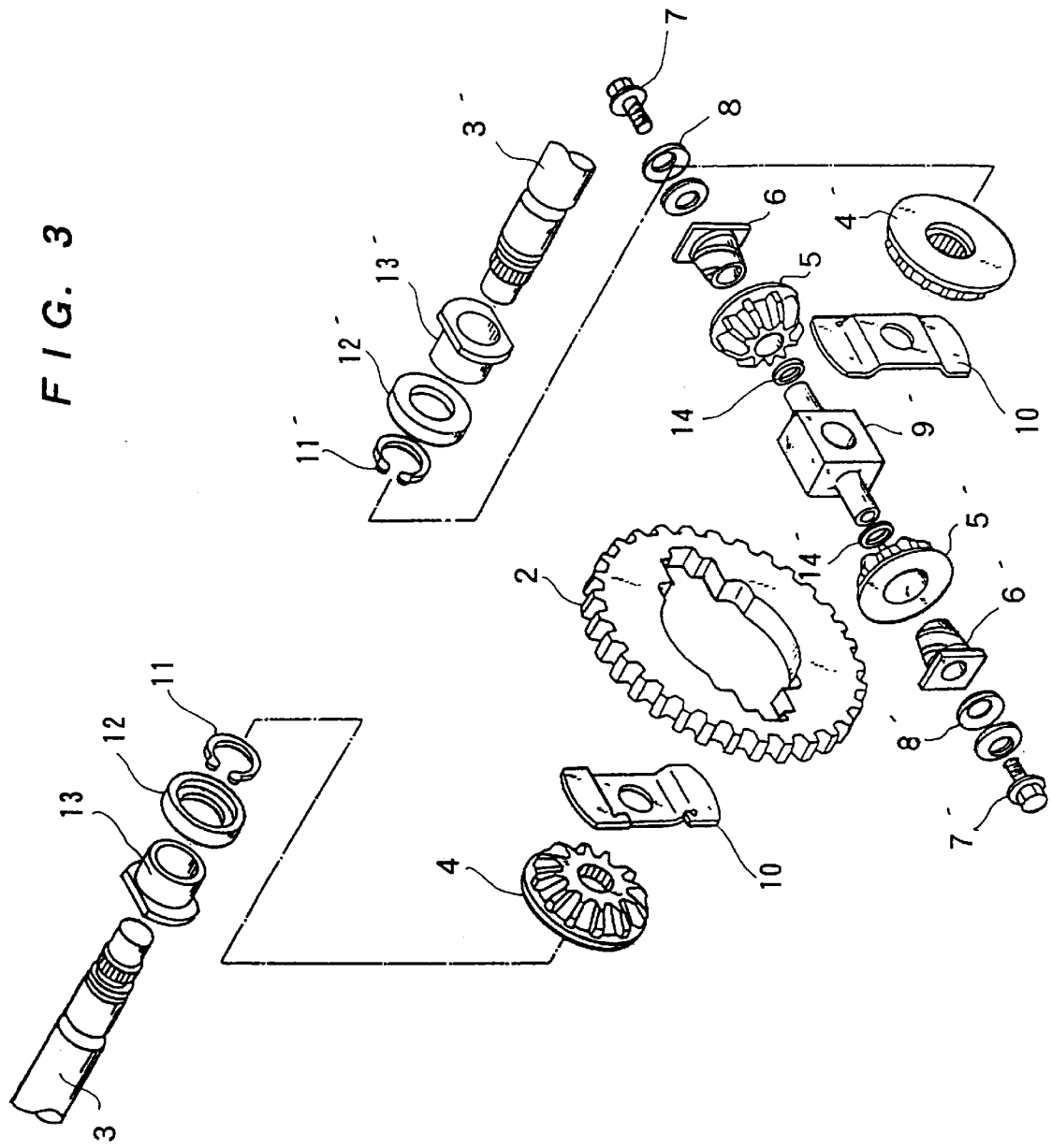
FIG. 3 is an exploded perspective view of the differential gear assembly shown in FIG. 1.

Referring to FIGS. 1–3, a first preferred embodiment of differential gear assembly of the invention will now be described below.

A differential gear assembly 1 comprises a simple disc-shaped input gear 2. The input gear 2 includes a central portion, an outer portion around the central portion, and one or more open space portions formed between the central portion and the outer portion.

In this embodiment, as shown in the drawings, the input gear 2 has one relatively large opening 2A in which a central member 9 forming said central portion is situated. The open space portions are formed opposite each other relative to the central portion and include first recesses 2a, 2a', second recesses 2b, 2b' extend radially outwardly from the first recesses 2a, 2a' with steps, and further, third recesses 2c, 2c' extend outwardly from the second recesses 2b, 2b' with steps.

Provided in the open space portions of the input gear 2 are a pair of support shafts 9B, 9B' extending radially from the central member, bevel pinions 5, 5' rotatably supported on the support shafts 9B, 9B' and friction members 6, 6' for generating rotational resistance against the rotation of the bevel pinions 5, 5'. A central bore 9A formed in the central member 9 receives the end portions of the facing pair of output shafts 3, 3'. Side bevel gears 4, 4' are fitted to the output shafts 3, 3' unrotatable relative thereto to mesh with the bevel pinions 5, 5'. The support shafts are provided with an internal thread that axially extend from their end.

The bevel pinions 5, 5' are provided with holes 5A, 5A' through which the support shafts 9B, 9B' pass and support the bevel pinions 5, 5', respectively. Washers 14, 14' are disposed between the bevel pinions 5, 5' and the central member 9. The bevel pinions 5, 5' are positioned in close proximity of the shoulders of the first recesses 2a, 2a', whereby the bevel pinions 5, 5' can be prevented from tilting during rotation. The holes 5A, 5A' of the bevel pinions 5, 5' are provided with male coned friction faces (first friction faces) 5B, 5B' that taper toward the center of the input gear 2.

Annular friction members 6, 6' are mounted on the support shafts 9B, 9B' in an axially slidable manner, but cannot rotate relative to the support shafts 9B, 9B'. Formed on the friction members 6, 6' are male coned friction faces (second friction faces) 6A, 6A' that are adapted to engage the first friction faces 5B, 5B', each face being provided with a helical groove for discharging oil mist entering the gap between the first and second friction faces 6A, 6A' and 5A, 5A'. By forming the groove as necessary, it is possible to prevent the reduction of frictional resistance between the first friction faces 5B, 5B' and the second friction faces 6A, 6A'. Further, formed on the friction members 6, 6' are flanges 6B, 6B' that contact the side walls of the second recesses 2b, 2b' of the input gear 2. In Embodiment 1, the flanges 6B, 6B' are rectangular, but the shape of the flanges is not limited thereto so long as the rotation is prevented by the contact of the side walls with the second recesses. Via the flanges 6B, 6B', drive torque is transmitted from the input gear 2 to the bevel pinions 5, 5'.

End pieces 7, 7' are detachably screwed into the support shafts 9B, 9B', respectively, in a position-adjustable manner along the axes of the support shafts. In Embodiment 1, bolts are used as the end pieces 7, 7'. Bolt heads 7A, 7A' of the end pieces 7, 7' are inserted into third recesses 2c, 2c' of the input gear 2. As shown in FIGS. 1 and 2, since the side faces of the bolt heads 7A, 7A' are in close proximity of the side walls of the third recesses 2c, 2c', the end piece 7, 7' cannot rotate about the supports shafts 9B, 9B'. Accordingly, there occurs no slack in the screw fastening between the end piece 7, 7' and the support shafts 9B, 9B'.

Biasing members 8, 8' are disposed between the flanges 7B, 7B' of the end pieces 7, 7' and the friction members 6B, 6B'. In Embodiment 1, four belleville springs are used as the biasing members 8, 8'. The biasing members 8, 8' urge the first friction faces 5B, 5B' against the second friction faces 6A, 6A'. Biasing force of the biasing members 8, 8' can be adjusted by the positions of the end pieces 7, 7' on the support shafts. As described, since the flanges 6B, 6B' of the friction members 6, 6' contact the side walls of the second recesses 2b, 2b' of the input gear 2, the friction members 6, 6' cannot rotate about the support shafts 9B, 9B' within the second recesses 2b, 2b'. Therefore, when the first friction faces 5B, 5B' are pressed against the second friction faces 6A, 6A', rotational resistance can be imparted against the rotation of the bevel pinions 5, 5'. The biasing members 8, 8' are provided with holes through which the end pieces 7, 7' pass with a small clearance to thereby facilitate the positioning of the biasing members 8, 8'.

The side bevel gears 4, 4' in mesh with the bevel pinions 5, 5' are mounted on the output shafts 3, 3' unrotatably relative thereto. In the drawings, the reference numerals 10, 10' denote pressure plates for preventing the tilting of the input gear 2, the numerals 11, 11' denote snap rings for preventing the side bevel gears 4, 4' from slipping off, the numerals 13, 13' denotes bushes through which are attached to a body of a vehicle to support the output shafts 3, 3' are fitted to the input gear 2, and the numerals 12, 12' denote spacers for positioning the bushes 13, 13'.

The internal operation of the differential gear 1 of Embodiment 1 will be described below.

When the input gear 2 is rotationally driven by the drive force transmitted from a drive source, the drive force is transmitted to the bevel pinions 5, 5' via the flanges 6B, 6B', so that the bevel pinions 5, 5' circle around the axis of the input gear 2 with the rotation of the input gear 2.

When load is equally applied on the output shafts 3, 3', both the side bevel gears 4, 4' rotate at the same rate as that of circling of the bevel pinions 5, 5' around the axis of the input gear 2. Therefore, drive force is equally applied on both output shafts 3, 3'.

By contrast, in conventional differential gear assemblies, when there is inequality of the load applied on the output shafts 3, 3', e.g., when one ground wheel mounted on the output shaft 3 is stuck in muddy ground, the bevel pinions 5, 5' circle around the axis of the input gear 2 while rotating about the support shafts 9b, 9b', so that the output shaft 3' bearing a heavier load and the bevel gear 4' keep stationary, and the output shaft 3 bearing a lighter load and the side bevel gear 4 spin at a high speed. Therefore, the drive force transmitted to the side bevel gear 4' is extremely small or zero.

However, the differential gear assembly 1 of Embodiment 1 is constructed to impart frictional resistance against the rotation of the bevel pinions 5, 5' beforehand, so that the rotation of the bevel pinions 5, 5' can be restricted to some degree. Therefore, wheel spin can be prevented, and drive force can also be transmitted to the side bevel gear 4' that bears a higher load.

As apparent from the foregoing, according to the differential gear assembly 1 of Embodiment 1, it is possible to provide a limited slip effect without using a casing-shaped ring gear. Accordingly, it is possible to make the resulting assembly compact and less costly.

Embodiment 2

Figure 4:
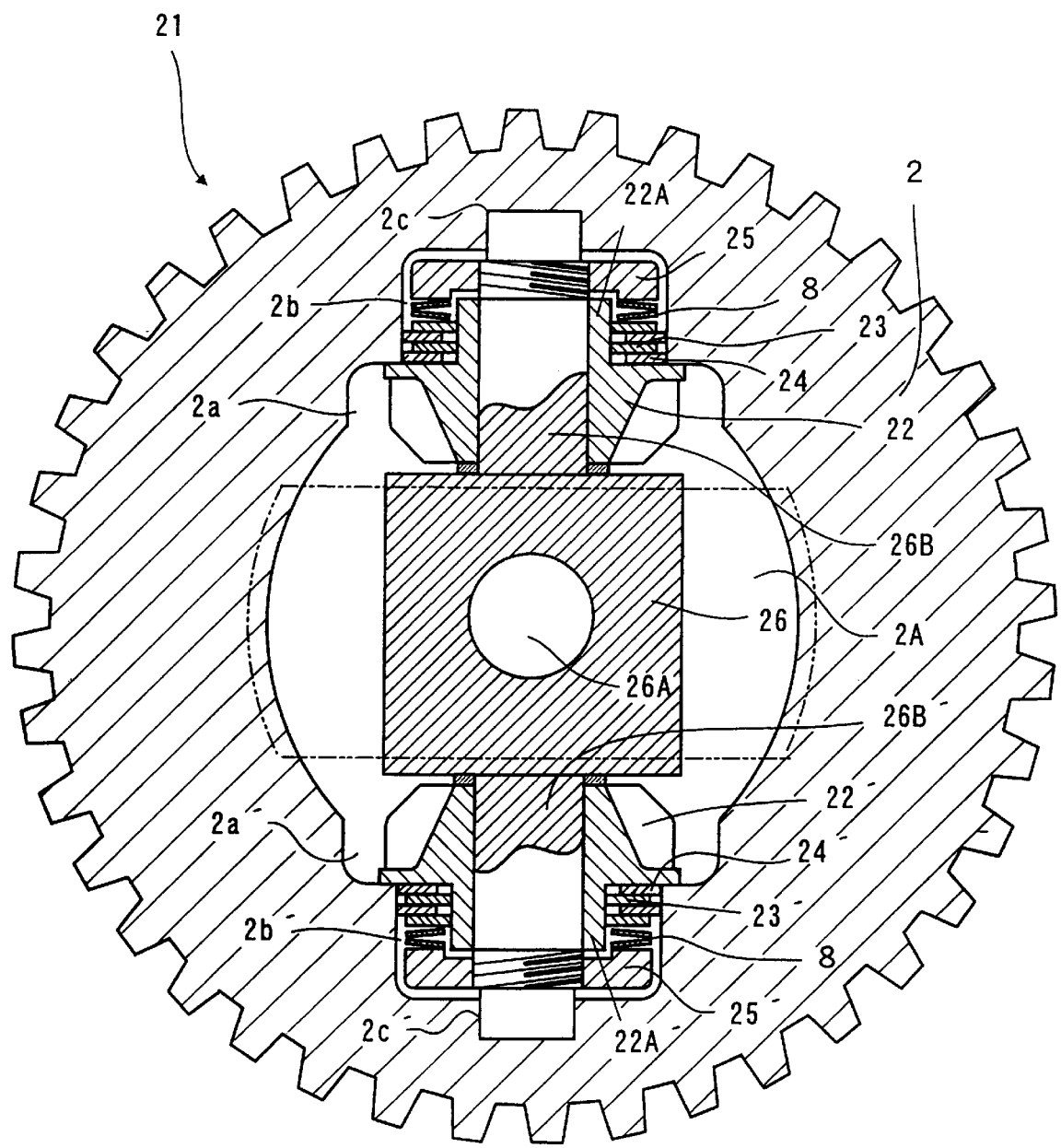
FIG. 4 is a vertical longitudinal section of a second embodiment of differential gear assembly of the present invention.
Figure 5:
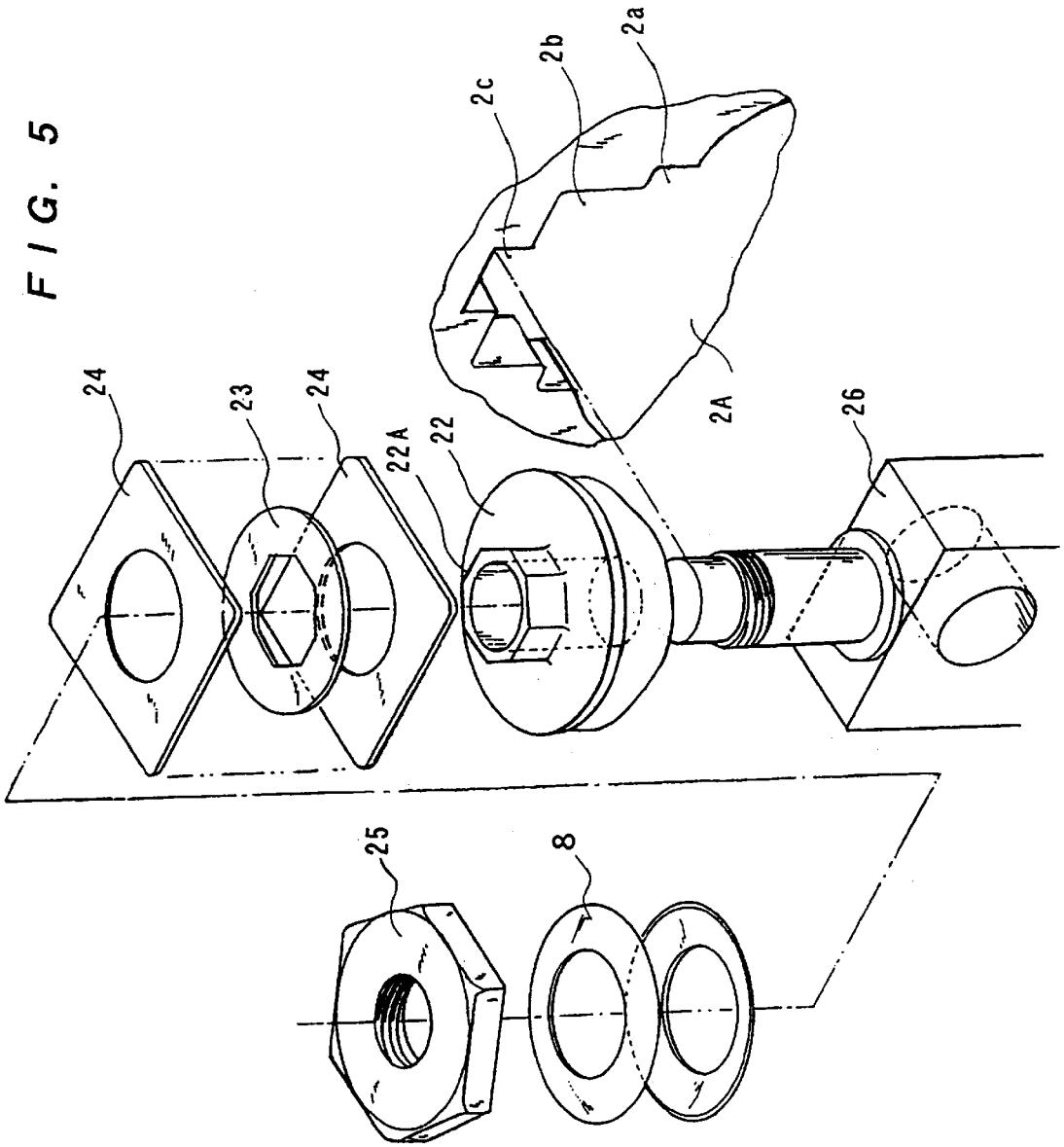
FIG. 5 is an exploded perspective view of the part for generating a predetermined rotational resistance to a bevel pinion in the differential gear assembly shown in FIG. 4.

Referring to FIGS. 4 and 5, a second preferred embodiment of differential gear assembly of the invention will now be described.

A differential gear assembly 21 of Embodiment 2 is constructed to impart rotational resistance to bevel pinions 22, 22' by using first friction plate 23, 23' and second friction plates 24, 24' instead of the friction members 6, 6' of Embodiment 1.

As shown in the drawings, a central member 26 is provided with a central bore 26A at its central portion. The central bore 26A supports the end portions of the facing output shafts 3, 3'. A pair of support shafts 26B, 26B' extend from the central member 26 radially of the input gear 2 into the open space portions that include the first recesses 2a, 2a', the second recesses 2b, 2b' and the third recesses 2c, 2c'. The support shafts 26B, 26B' are located opposite each other relative to the center of the central member 26. The support shafts 26B, 26B' are each provided with an axially threaded portion on their circumferential surfaces. The end portions of the support shafts 26B, 26B' are fitted in the third recesses 2c, 2c' of the input gear 2, respectively. Via the fitted end portions of the support shafts, drive force of the input gear 2 is transmitted to the bevel pinions 22, 22'.

The bevel pinions 22, 22' are provided with holes through which the support shafts 26B, 26B' pass, respectively. To support the bevel pinions 22, 22', washers 14, 14' are disposed between the bevel pinions 22, 22' and the support shafts 26B, 26B'. Formed on the outer faces of the bevel pinions 22, 22' are polygonal annular projections 22A, 22A'. First friction plates 23, 23' are fitted to the projections 22A, 22A' in contact with the flat faces of second friction plates 24, 24'.

The first friction plates 23, 23' are each provided with a polygonal opening which largely corresponds with the polygonal projections 22A, 22A' in shape. Accordingly, the first friction plates 23, 23' cannot rotate relative to the bevel pinions 22, 22' and engage the projections 22A, 22A' in a slidable manner along the axes of the projections 22A, 22A', respectively. Further, the first friction plates 23, 23' may have any outline so-long as they can rotate with the bevel pinions 22, 22' within the recesses 2b, 2b' of the input gear 2. In Embodiment 2, the friction plates 23, 23' are of circular outline which diameter is smaller than those of the recesses 2b, 2b'.

The second friction plates 24, 24' are each provided with an opening which diameter is larger than that of the polygonal projections 24A, 24A'. The peripheries of the second friction plates 24, 24' contact the side walls of the second recesses 2b, 2b' of the input gear 2, so that the second friction plates 24, 24' cannot rotate within the second recesses 2b, 2b'. In Embodiment 2, the outlines of the second friction plates 24, 24' constitute a rectangular shape.

The end pieces 25, 25' are detachably screwed onto the support shafts 26B, 26B' in a position-adjustable manner along the axes of the shafts. In Embodiment 2, nuts are used as the end pieces 25, 25'. The circumferential faces of the end pieces 25, 25' are in close proximity of the side walls of the second recesses 2b, 2b'. Thereby, the end pieces 25, 25' do not rotate about the support shafts 26B, 26B' within the second recesses 2b, 2b', respectively. Therefore, there occur no slack in the screw fastening between the end pieces 25, 25' and the supports shafts 26B, 26B'.

Biasing members 8, 8' are disposed between the end pieces 25, 25' and the uppermost plate of the first and second friction plates 23, 23' and 24, 24'. In Embodiment 2, two belleville springs are used as the biasing members 8, 8'. The biasing members 8, 8' urge the first friction plates 23, 23' against the second friction plates 24, 24'.

The internal operation of the differential gear assembly 21 of Embodiment 2 will now be described below.

When the bevel pinions 22, 22' rotate, the first friction plates 23, 23' engaged therewith also rotate. On the other hand, the second friction plates 24, 24', as described above, do not rotate within the second recesses 2b, 2b' of the input gear 2. Therefore, there is frictional resistance generated between the first friction plates 23, 23' and the second friction plates 24, 24'. Therefore, a predetermined rotational resistance can be imparted to the bevel pinions 22, 22'.

According to the thus constructed differential gear assembly 21 of Embodiment 2, it is possible to provide a limited-slip effect as in Embodiment 1 without using a casing-shaped ring gear. This means that the resulting assembly can be made compact and less costly.

Embodiment 3

Figure 7:
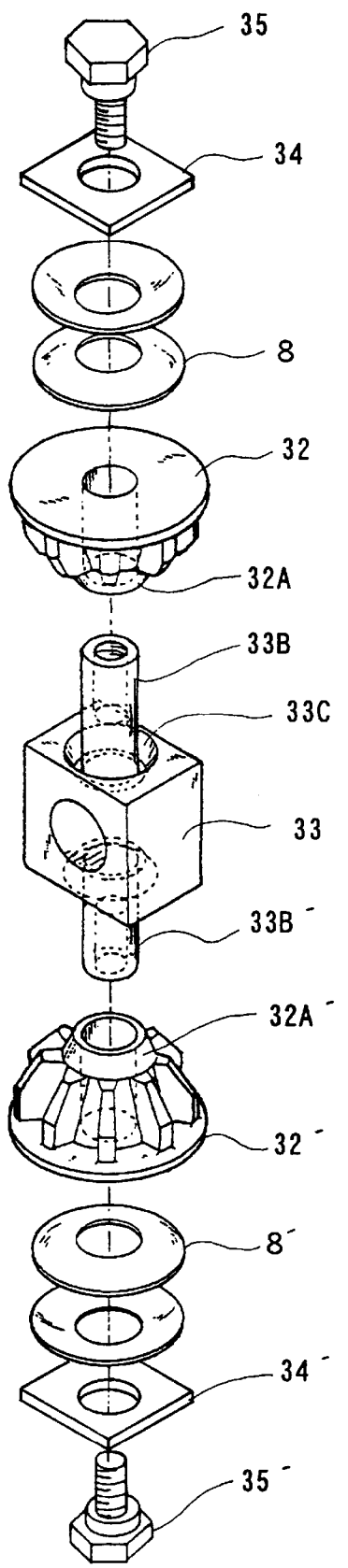
FIG. 7 is an exploded perspective view of the part for generating a predetermined rotational resistance to a bevel pinion in the differentia gear assembly shown in FIG. 6.

Referring now to FIGS. 6 and 7, a third preferred embodiment of differential gear assembly of the invention will be described below.

A differential gear assembly 31 of Embodiment 3 is constructed to impart a predetermined rotational resistance to bevel pinions 32, 32' without using special components as necessary in Embodiments 1 and 2.

As shown in the drawings, a central bore 33A is formed in a central member 33. The output shafts 3, 3' are supported by the central bore 33A. A pair of support shafts 33B, 33B' extend from the central member 33 radially of the input gear 2 into the open space portions. The support shafts 33B, 33B' are located opposite each other relative to the center of the central member 33. The support shafts 33B, 33B' are each provided with an internal thread that extends radially inwardly from the shaft end.

The bevel pinions 32, 32' are each provided with a hole through which the support shafts 33B, 33B' pass, respectively. The bevel pinions 32, 32' are supported by the support shafts 33B, 33B' via these holes. Formed on the end portions of the bevel pinions 32, 32' are male coned friction faces (first friction faces) 32A, 32A' tapering toward the center of the input gear. The first friction faces 32A, 32A' contact female coned friction faces (second friction faces) 33C, 33C' that are formed to surround the support shafts 33B, 33B' and taper correspondingly to the first friction faces.

End pieces 35, 35' are detachably screwed into the support shafts 33B, 33B' in a position-adjustable manner along the axes of the support shafts. In Embodiment 3, fastening bolts are used as the end pieces 35, 35'. Bolt heads 35A, 35A of the end pieces 35, 35' are inserted into the third recesses 2c, 2c' of the input gear 2. As shown in FIGS. 6 and 7, the side faces of the bolt heads 35A, 35A' are in close proximity of the side walls of the third recesses 2c, 2c', respectively. Thereby, the end pieces 35, 35' do not rotate about the support shafts 33B, 33B' within the third recesses 2c, 2c'. Accordingly, there occurs no slack in the screw fastening between the end pieces 35, 35' and the support shafts 33B, 33B'.

Pressure plate 34, 34' are fitted to body portions 35B, 35B' of the end pieces 35, 35', respectively. The pressure plates 34, 34' are constructed such that their circumferential faces may contact the side walls of the second recesses 2b, 2b'. Thereby, the pressure plates 34, 34' do not rotate about the support shafts 33B, 33B' within the second recesses 2b, 2b'. Accordingly, by means of the pressure plates 34, 34', drive torque of the input gear 2 is transmitted to the bevel pinions 32, 32'.

Biasing members 8, 8' are disposed between the pressure plates 34, 34' and the bevel pinions 32, 32', respectively. In Embodiment 3, two belleville springs are used for each of the biasing members 8, 8'. The biasing members 8, 8' urge the first friction faces 32A, 32A' against the second friction faces 33C, 33C'. Thereby, rotational resistance is imparted to the rotation of the bevel pinions 32, 32'.

According to the thus constructed differential gear assembly of Embodiment 3, it is possible to provide a limited slip effect as in the above previous embodiments without using a casing-shaped ring gear. Accordingly, it is possible to make the resulting assembly compact and less costly. Furthermore, since the differential gear assembly 31 of Embodiment 3 do not need any special component such as a friction member, it is possible to make the assembly more compact and less costly than the above previous embodiments.

Figure 8:
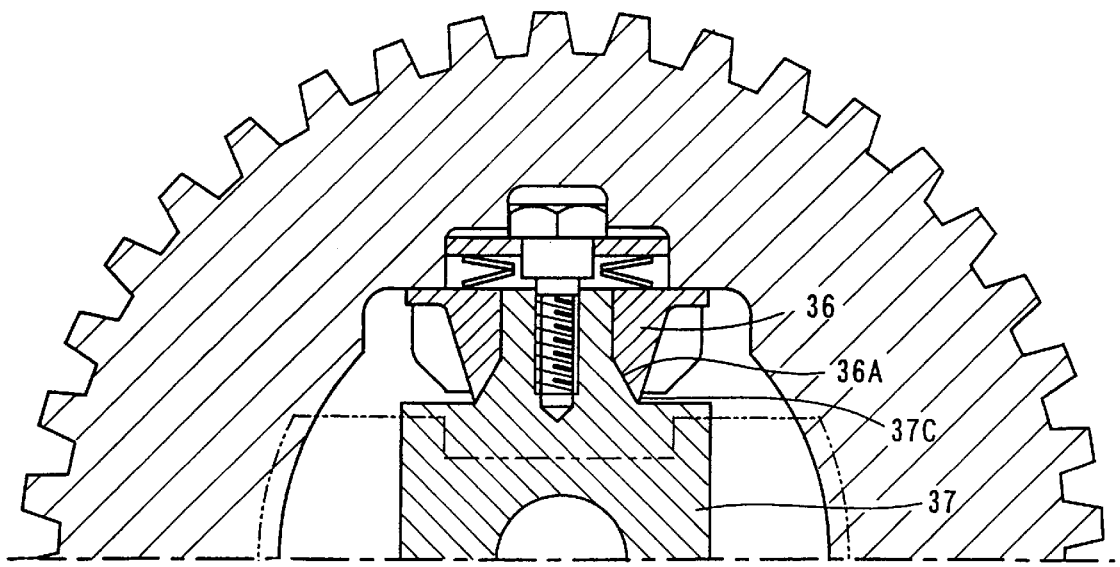
FIG. 8 is a vertical transverse section of a variant of the differential gear assembly shown in FIG. 6.

As described, Embodiment 3 employs the bevel pinions 32, 32' having male coned friction faces (the first friction faces 32A, 32A') on their end portions and the central member 33 having female coned friction faces (second friction faces) 33C, 33C' for frictionally engaging the first friction faces 32A, 32A', but it is also possible to reverse the male/female relationship of the first and second friction faces as shown in FIG. 8. More specifically, as shown in FIG. 8, it is possible to employ i) bevel pinions 36, 36' having, as first friction faces 36A, 36A', female coned friction faces tapering radially outwardly of the input shaft; and ii) central members 37, 37' having, as second friction faces 37C, 37C', male coned friction faces tapering correspondingly to the first friction faces to obtain the same effect as that of Embodiment 3.

Embodiment 4

Figure 9:
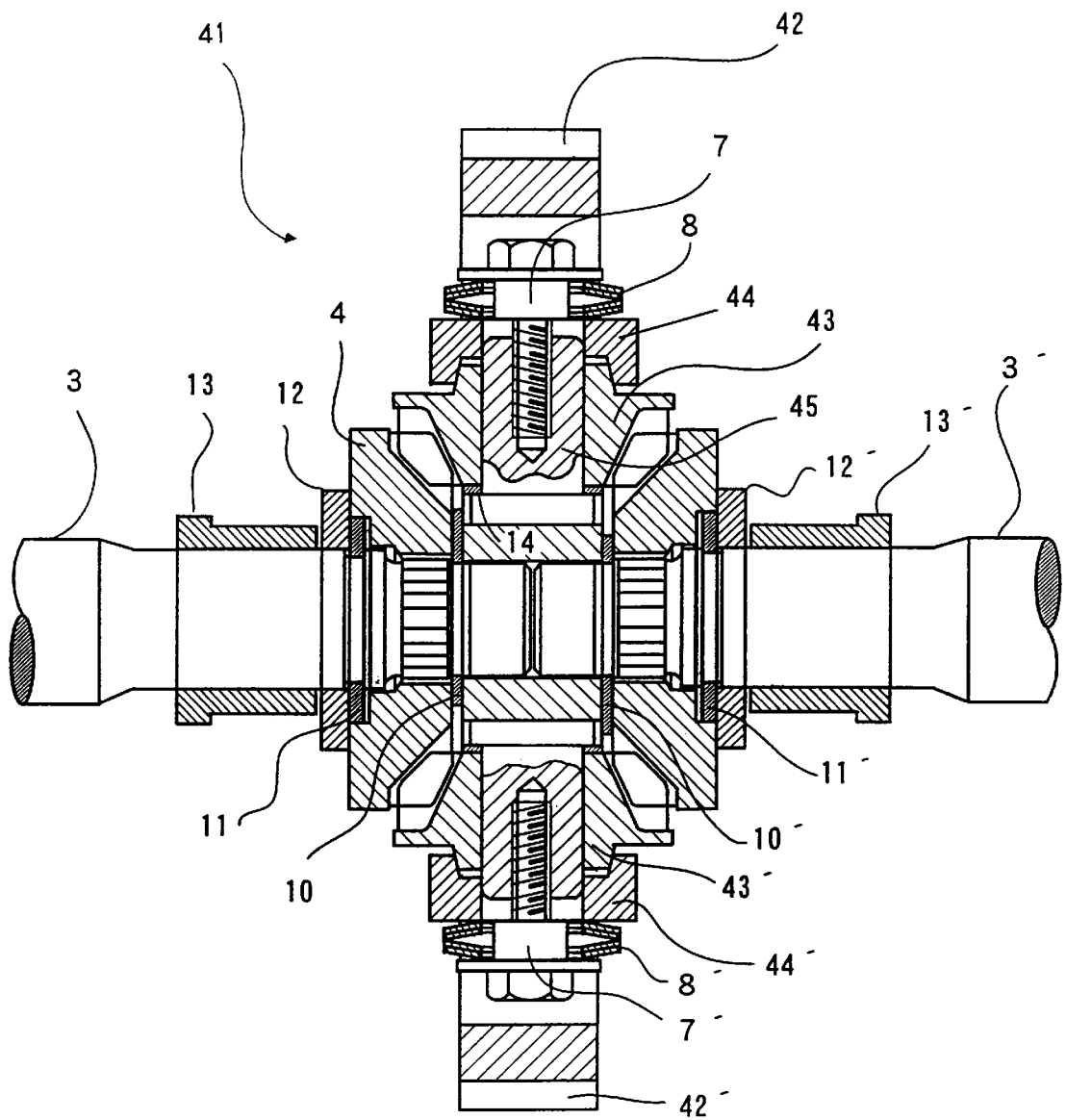
FIG. 9 is a vertical longitudinal section of a forth embodiment of differential gear assembly of the present invention.
Figure 10:
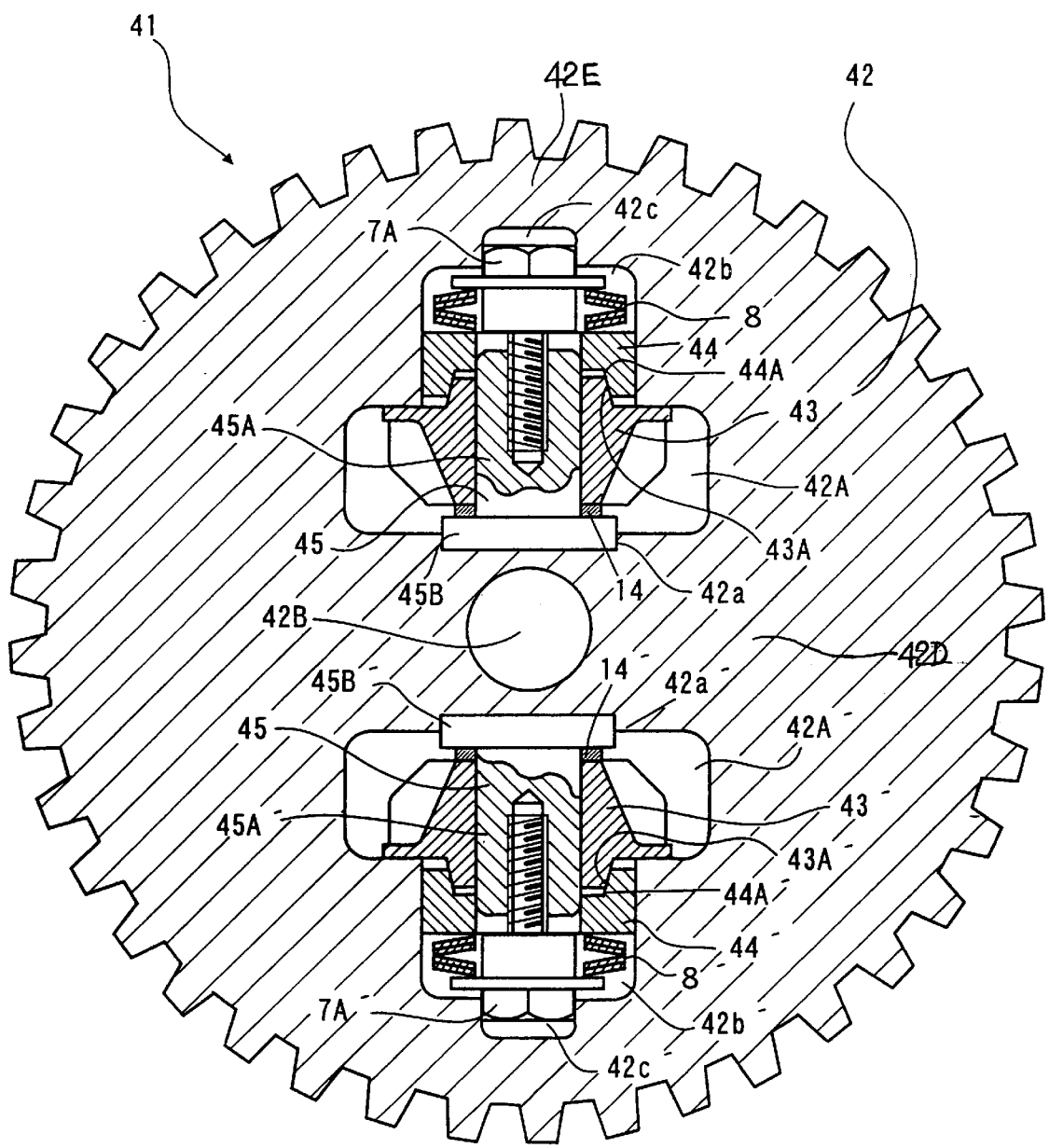
FIG. 10 is a vertical transverse section of the differential gear assembly shown in FIG. 9.
Figure 11:
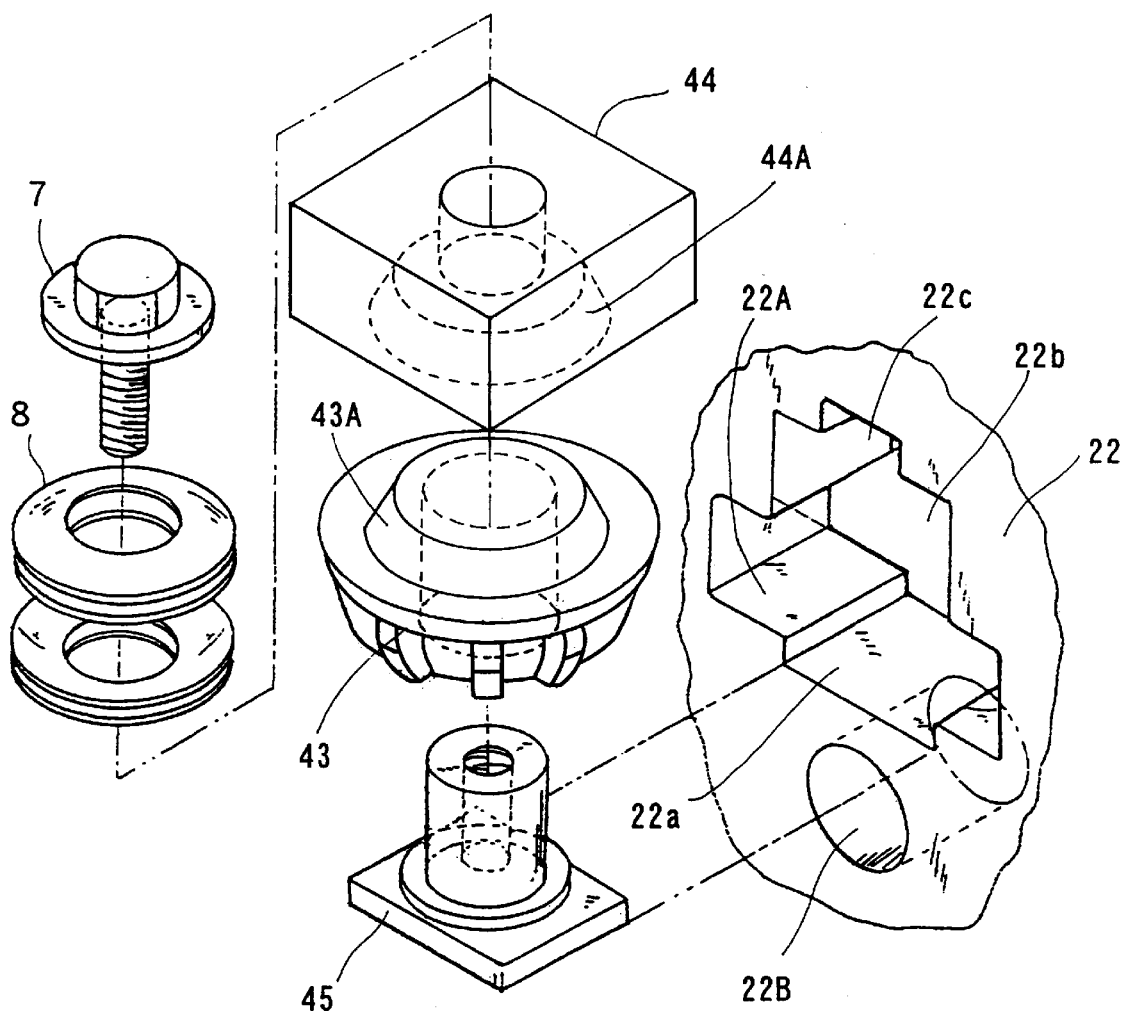
FIG. 11 is an exploded perspective view of the part for generating a predetermined rotational resistance to a bevel pinion in the differentia gear assembly shown in FIG. 9.

Referring now to FIGS. 9–11, a forth preferred embodiment of differential gear assembly of the invention will be described below.

A differential gear assembly 41 of Embodiment 4 has a central portion 42D formed integrally with the outer portion 42E of the input gear 42, leaving the open space portions 42A, 42A' as two discrete through openings that are located opposite each other relative to the central portion 42D.

As shown in the drawings, an input gear 42 is provided with a central bore 42B at its central portion 42D. The central bore 42B receives the end portions of the facing output shafts 3, 3'. The open space portions 42A, 42A' are provided with first recesses 42a, 42a' that extend radially inwardly of the input gear 42. The open space portions 42A, 42A' are also provided with second recesses 42b, 42b' and third recesses 42c, 42c' that extend radially outwardly of the input gear 42 with steps, respectively.

Support shafts 45, 45' are situated in the open space portions 42A, 42A' of the input gear 42, extending radially outwardly from the central portion of the input gear 42. The support shafts 45, 45' have rods 45A, 45A', respectively, for rotatably supporting the bevel pinions 43, 43'. Further, the support shafts 45, 45' are provided with flanges 45B, 45B', respectively, that contact the side walls of the first recesses 42a, 42a' of the input gear 42. In Embodiment 4, the outlines of the flanges 45B, 45B' constitute a rectangular shape, but their shapes are not limited thereto. The support shafts 45, 45' are held in place by the flanges 45B, 45B'. Further, since the circumferential faces of the flanges 45B, 45B' contact the side walls of the recesses 42a, 42a', the flanges 45B, 45B' can constitute a part of the route for transmitting drive torque of the input gear 42 to the bevel pinions 43, 43'.

The bevel pinions 43, 43' are each provided with a hole through which the support shafts 45, 45' pass. The bevel pinions 43, 43' are supported by the support shafts 45, 45' via these holes. The washers 14, 14' are disposed between the bevel pinions 43, 43' and the support shafts 45, 45'. Annular projections are provided on the outer flat faces of the bevel pinions 43, 43', respectively. Formed on the projections are male coned friction faces as first friction faces 43A, 43A' tapering radially outwardly of the input gear 42.

The teeth of the bevel pinions 43, 43' extend beyond the thickness of the input gear 42 on the opposite sides so as to mesh-with the side bevel gears 4, 4'.

Annular friction members 44, 44' are fitted to the support shafts 45, 45' in an axially slidable manner. Formed in the inside of the friction members 44, 44' are female coned friction faces as second friction faces 44A, 44A' that are adapted to engage the first friction faces 43A, 43A'. The outer circumferential faces of the friction members 44, 44' contact the side walls of the second recesses 42b, 42b' of the input gear 42 so that the friction members 44, 44' cannot rotate about the support shafts 45, 45' within the second recesses 42b, 42b'. In Embodiment 4, the friction members 44, 44' are rectangular, but their shapes are not limited thereto. By using the friction members 44, 44' of such a shape, drive torque of the input gear 42 is transmitted to the bevel pinions 43, 43' via the friction members 44, 44'.

According to the thus constructed differential gear 41 of Embodiment 4, it is possible to provide a limited slip effect as in the previous embodiments without using a casing-shaped ring gear.

As described above, the differential gear assembly 41 of Embodiment 4 is constituted by the bevel pinions 43, 43' having a male coned friction face as a first friction face and the friction members 44, 44' having a female coned friction face as a second friction face. However, the same effect can be obtained by using bevel pinions 5, 5' having a female coned friction face as a friction face and friction members 6, 6' having a male coned friction face as a second friction face instead of using these components. Conversely, it is also possible to obtain the same effect by providing the differential gear assembly 1 of Embodiment 1 with the bevel pinions 43, 43' and the friction members 44, 44' of Embodiment 4 instead of the bevel pinons 5, 5' and the friction members 44, 44'.

Embodiment 5

Figure 12:
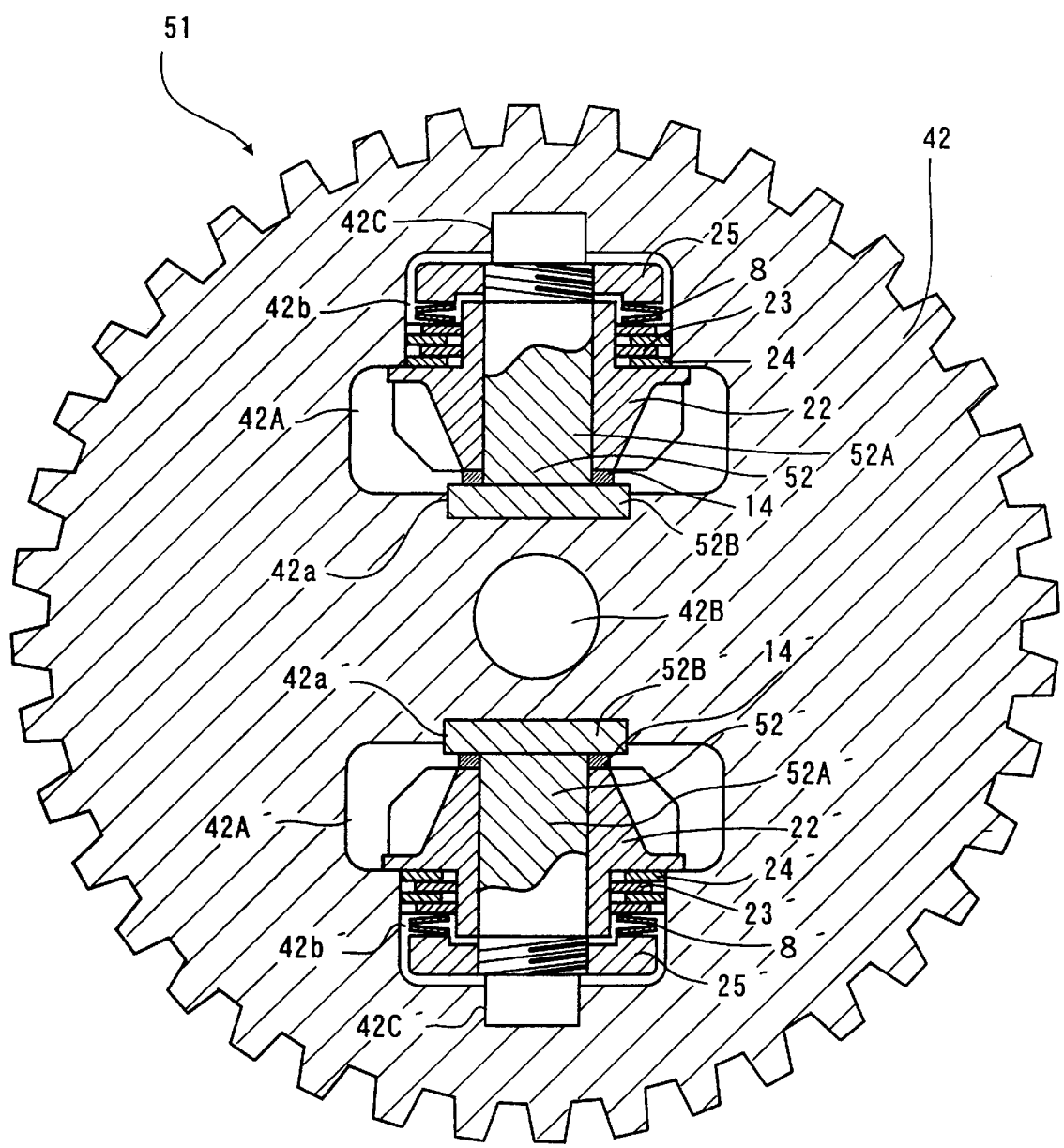
FIG. 12 is a vertical transverse section of a fifth embodiment of differential gear assembly of the present invention.
Figure 13:
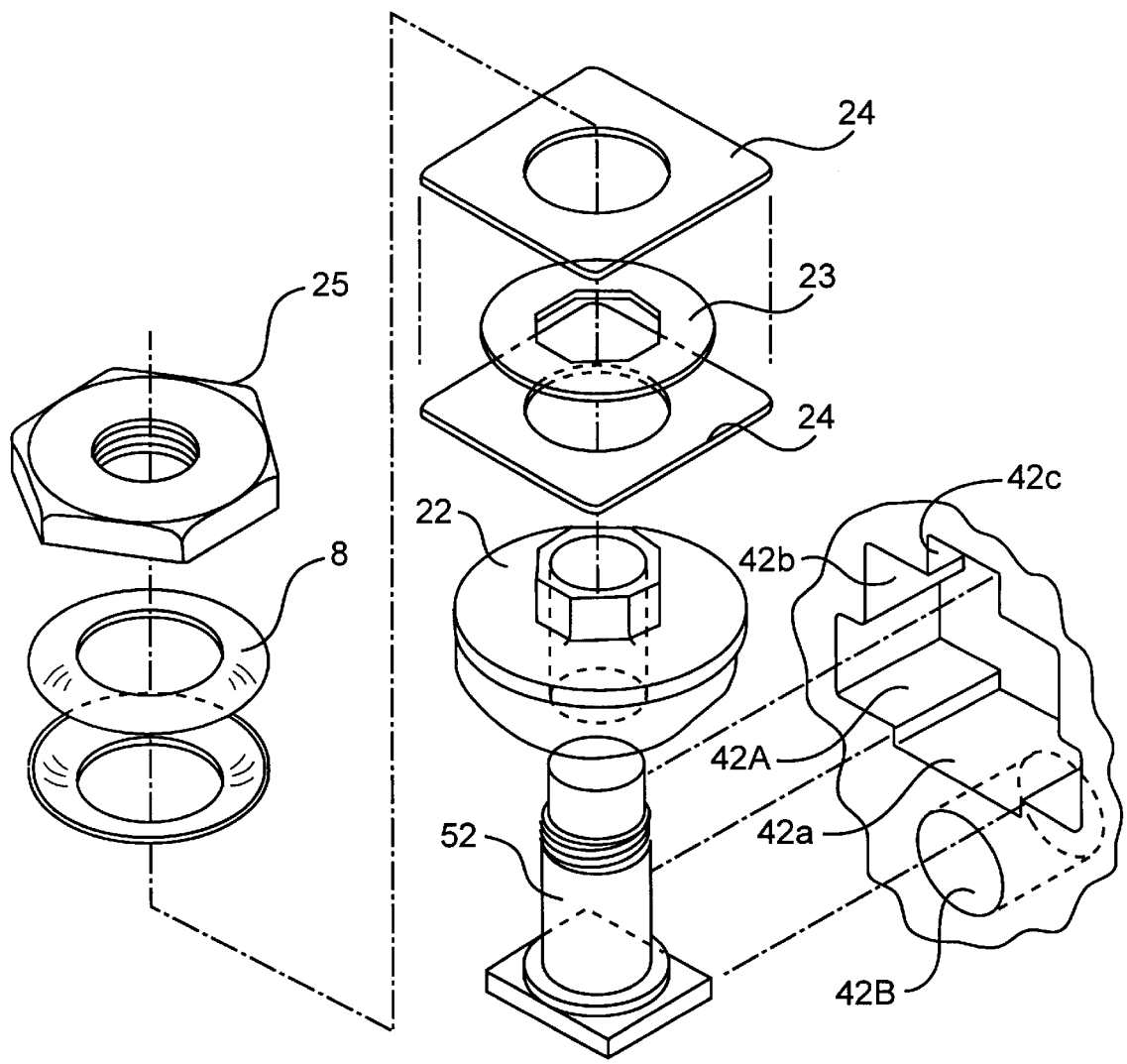
FIG. 13 is an exploded perspective view of the part for generating a predetermined rotational resistance to a bevel pinion in the differentia gear assembly shown in FIG. 12.

Referring now to FIGS. 12 and 13, a preferred fifth embodiment of differential gear assembly of the invention will be described below.

Support shafts 52, 52' are situated in the open space portions 42A, 42A' of the input gear 42, extending radially outwardly from the central portion of the input gear 42.

The support shafts 52, 52' have rods 52A, 52A', respectively, for rotatably supporting the bevel pinions 22, 22'. The rods 52A, 52A' are each provided with a threaded portion on their circumferential surfaces. Further, the support shafts 52, 52' are provided with flanges 52B, 52B' that contact the side walls of the first recesses 42a, 42a' of the-input gear 42, respectively. In Embodiment 5, the outlines of the flanges 52B, 52B' constitute a rectangular shape, but the shape is not limited thereto. One end portions of the rods 52A, 52A' are fitted in third recesses 42c, 42c' of the input gear 42, respectively. The support shafts 52, 52' are held in place by the fitted end portions of the rods 52A, 52A' and the flange 52B, 52B', so that the support shafts 52, 52' extend radially outwardly from the central portion of the input gear 42 in the open space portions 42A, 42A' of the input gear 42. Further, drive torque of the input gear 42 is transmitted to the bevel pinions 43, 43' via the fitted ends of the rods 52A, 52A' and the flanges 52B, 52B'.

The end pieces 25, 25' are detachably screwed to the support shafts 52, 52' in a position-adjustable manner along the axis of the support shafts. In Embodiment 5, nuts are used as the end pieces 25, 25'. The circumferential faces of the end pieces 25, 25' are in close proximity of the side walls of the second recesses 42b, 42b' of the input gear 42, so that the end pieces 25, 25' do not rotate about the support shafts 52, 52' within the second recesses 42b, 42b'. Accordingly, there occurs no slack in the screw fastening between the end pieces 25, 25' and the support shafts 52, 52'.

According to the thus constructed differential gear assembly 51 of Embodiment 5, it is possible to obtain a limited slip effect, as in the previous embodiments, without using a casing-shaped ring gear.

Embodiment 6

Figure 14:
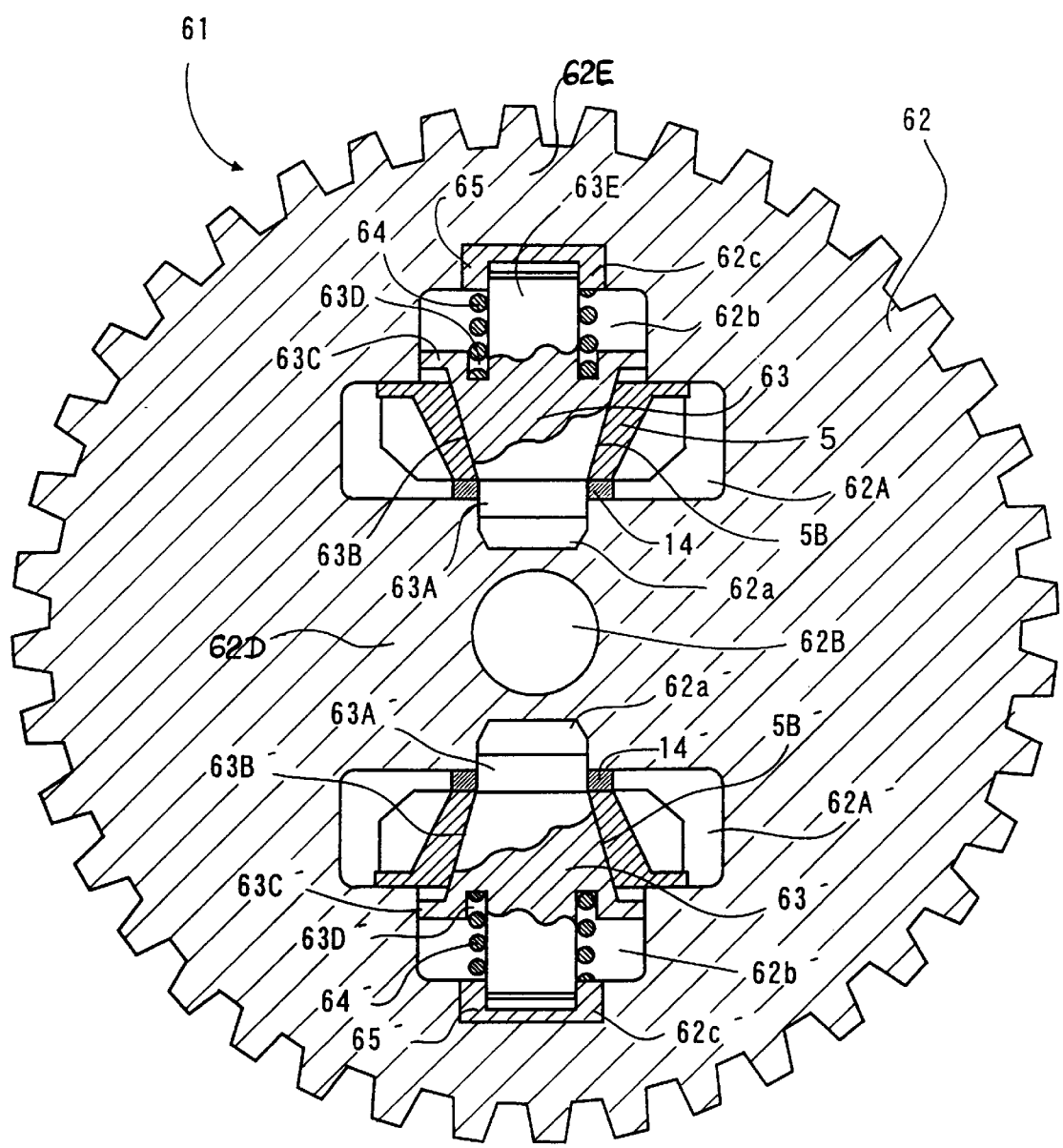
FIG. 14 is a vertical transverse section of a sixth embodiment of differential gear assembly of the present invention.

Referring now to FIG. 14, a preferred sixth embodiment of differential gear assembly of the invention will be described below.

A differential gear assembly 61 of Embodiment 6 uses coil springs, instead of belleville springs, in the differential gear assembly of Embodiment 4.

As shown in the drawing, an input gear 62 is provided with a central bore 62B at its central portion. The end portions of the facing output shafts 3, 3' are received in the central bore 62B. Further, the input gear 62 has a central portion 62D formed integrally with the outer portion 62E of the input gear 62, leaving the open space portions 62A, 62A' as two discrete through openings that are located opposite each other relative to the central portion 62D. The open space portions 62A, 62A' are provided with first recesses 62a, 62a' of substantially rectangular shape, second recesses 62b, 62b' extending radially outwardly from the first recesses 62a, 62a' with steps, and third recesses 62c, 62c' extending radially outwardly from the second recesses 62b, 62b' with steps, respectively.

The support shafts 63, 63' have projections 63A, 63A' fitted in the first recesses 62a, 62a'. When the projections 63A, 63A' are fitted in the recesses 62a, 62a', there are provided gaps therebetween in a radial direction of the projections 63A, 63A'. The support shafts 63, 63' has male coned friction faces tapering toward the center of the input gear as second friction faces 63B, 63B' that are continuous to the projections 63A, 63A' and are adapted to engage the first friction faces 5B, 5B', respectively. Formed inside the bevel pinions 5, 5' are the first friction faces 5B, 5B' having female coned faces tapering correspondingly to the male coned faces of second friction faces. Formed on the bottom portions of the support shafts 63, 63' are flanges 63C, 63C' that contact the side walls of the second recesses 62b, 62b' of the input gear 62. Accordingly, the support shafts 63, 63' do not rotate within the recesses 62b, 62b'. Drive torque of the input gear 62 is transmitted to the bevel pinions 5, 5' via the flanges 63C, 63C'. Annular projections 63E, 63E' are formed on the flat faces of the support shafts 63, 63' facing radially outwardly of the input shaft 62. Further, formed in the flat faces of the support shafts 63, 63' are grooves 63D, 63D' surrounding the projections 63E, 63E'.

Coil springs 64, 64' are fitted to the projections 63E, 63E' and then received in the grooves 63D, 63D'. Pressure plates 65, 65' are fitted in third recesses 62c and 62c' of the input gear 62, compressing the coil springs. Therefore, the coil springs 64, 64' urge the first friction faces 5B, 5B' against the second friction faces 63B, 63B' according to the amount of spring force. As described above, since the support shafts 63, 63' do not rotate relative to the input gear, rotational resistance is imparted to the rotation of the bevel pinons 5, 5' owing to the frictional resistance generated between the first friction faces 5B, 5B' and the second friction faces 63B, 63B'.

According to the thus constructed differential gear assembly 61 of Embodiment 6, it is possible to obtain a limited slip effect, as in the previous embodiments, without using a casing-shaped ring gear.

Figure 15:
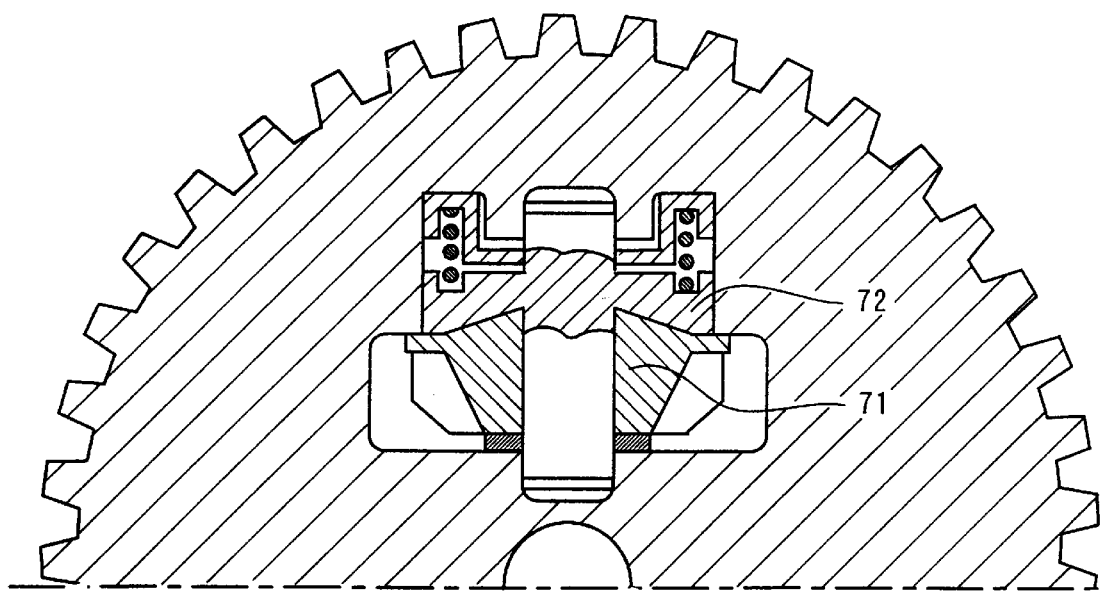
FIG. 15 is a vertical transverse of a variant of the differential gear assembly shown in FIG. 14.

Embodiment 6 employs the bevel pinions 5, 5' having a female coned friction face as a first friction face and the central member 63 having a male coned friction face as a second friction face, but it is possible to reverse the male/female relationship as shown in FIG. 15. More specifically, it is possible to form a male coned friction face as a first friction face on the rear of the bevel pinion 71 and a female coned friction face as a second friction face on the support shaft 72 to obtain the same effect as in Embodiment 6.

Embodiment 7

Figure 17:
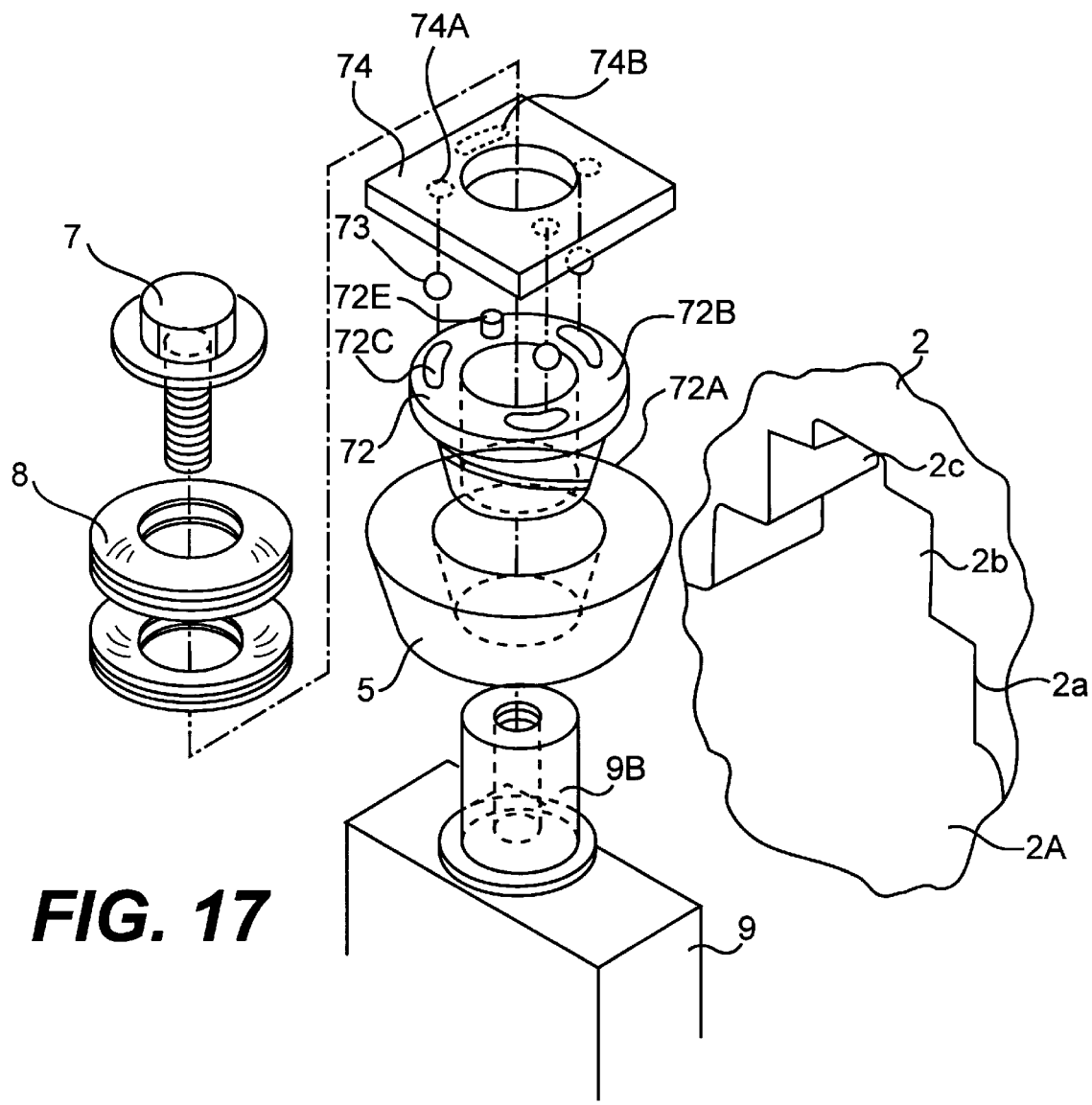
FIG. 17 is an exploded perspective view of the part for generating a predetermined rotational resistance to a bevel pinion in the differentia gear assembly shown in FIG. 16.

Referring now to FIGS. 16–18, a seventh preferred embodiment of differential gear assembly of the invention will be described below.

A differential gear assembly 71 of Embodiment 7 employs friction members composed of friction bodies 72, 72', pressure members 73, 73', and intermediate members 74, 74', instead of the friction members 6, 6' of Embodiment 1, to impart rotational resistance to the bevel pinions 5, 5' according to the amount of external load applied on ground wheels.

Annular friction bodies 72, 72' are rotatably fitted to the support shafts 9B, 9B' in an axially slidable manner. Formed on the friction bodies 72, 72' are male coned friction faces (second friction faces 72A, 72A') tapering toward the center of the input gear 2. The second friction faces 72A, 72A' are adapted to engage the first friction faces 5B, 5B' formed on the holes 5A, 5A' of the bevel pinions 5, 5' and tapering correspondingly to the first friction faces. Further, flanges 72B, 72B' are formed on the bottom portions of the friction bodies 72, 72'. The outlines of the flanges 72B, 72B' may take any shape so long as the friction bodies 72, 72' can rotate about the support shafts 9B, 9B'. In the instant embodiment, the outlines constitute a circular shape. The friction bodies 72, 72' are provided with cam grooves 72C, 72C' and projections 72E, 72E' on their flat faces facing radially outwardly of the input shaft 2. The cam grooves 72C, 72C' have slanted surfaces 72D, 72D' that become gradually shallower toward the opposite sides in a circumferential direction of the friction bodies 72, 72'. In the instant embodiment, the projections 72E, 72E' are integrally formed with the flanges 72B, 72B' of the friction bodies, but instead may be inserted into the holes formed'in the flanges 72B, 72B'.

The plate-shaped intermediate members 74, 74' are mounted on the support shafts 9B, 9B' in an axially slidable manner, but cannot rotate relative to the support shafts 9B, 9B'. The side faces of the intermediate members 74, 74' contact the side walls of the second recesses 2b, 2b' of the input gear 2 (see the same second recesses 2b, 2b' in FIG. 2) so that the intermediate members 74, 74' do not rotate about the support shafts 9B, 9B' within the recesses. In the instant embodiment, the intermediate members 74, 74' are rectangular, but their shapes are not limited thereto. Via the intermediate members 74, 74', drive torque of the input gear 2 is transmitted to the bevel pinions 5, 5'. The intermediate members 74, 74' are provided, on the side facing the flanges 72B, 72B', with shallow spherical cavities 74A, 74A' and recesses 74B, 74B' curved in a circumferential direction of the intermediate members. The projections 72E, 72E' of the friction bodies are received in the recesses 74B, 74B', respectively.

The pressure members 73, 73' in this instance are steel balls which are held between the cavities 74A, 74A' of the intermediate members and the cam grooves 72C, 72C' of the friction bodies. The adjusting mechanism is constituted by the pressure members 73, 73', cavities 74A, 74A' and slanted surfaces 72D, 72D' formed on the cam grooves 72C, 72C'. Instead of the pressure members of this embodiment, i.e., the steel balls located in the cavities 74A, 74A' of the intermediate members, projections may be integrally formed with the intermediate members 74, 74' as the pressure members.

The internal operation of the differential gear assembly 71 of Embodiment 7 will be described below.

The biasing means 8, 8' (belleville spring) are disposed between the end pieces 7, 7' and the intermediate members 74, 74', urging the friction bodies 72, 72' against the bevel pinions 5, 5' via the intermediate members 74, 74' and the pressure members 73, 73'. Accordingly, in normal conditions, the pressure members 73, 73' are located at the deepest point (see FIG. 18A) of the cam grooves 72C, 72C'. In this state, the first friction faces 5B, 5B' of the bevel pinions are urged against the second friction faces 72A, 72A' of the friction members by the biasing members 8, 8'. Thereby, a predetermined rotational resistance is imparted to the bevel pinions 5, 5', so that the bevel pinions 5, 5' are prevented from rotating to some degree, whereby drive force can be transmitted to a higher load applied wheel.

However, when there occurs a great imbalance in the external load applied between the output shafts 3, 3', i.e., when one of the ground wheels spins, it is impossible to prevent the rotation of the bevel pinions 5, 5' sufficiently only with the rotational resistance imparted by the biasing means 8, 8'. Accordingly, the bevel pinions 5, 5' rotate, and therefore, the amount of drive force transmitted to the heavier load bearing wheel is extremely small or zero.

According to the differential gear 71 of the instant embodiment, in such a case, the rotational resistance applied on the bevel pinions 5, 5' automatically increases, so that drive force can be transmitted to the heavier load bearing wheel.

More specifically, when the bevel pinions 5, 5' start to rotate about the support shafts 9B, 9B' in the direction indicated by an arrow in FIG. 18B, the friction bodies 72, 72' also rotate therewith in the direction indicated by the arrow. On the other hand, as described above, the intermediate members 74, 74' and the pressure members 73, 73' received in the cavities 74A, 74A' of the intermediate members do not rotate about the support shafts 9B, 9B'. As a result, the contact points of the friction bodies 72, 72' with the pressure members 73, 73' are displaced (see FIG. 18B). Since the cam grooves 72C, 72C' of the friction bodies have the slanted surfaces 72D, 72D' that become shallower from the deepest point to the downstream in a rotational direction, the pressure members 73, 73' press the friction bodies 72, 72' and the bevel pinions 5, 5' according to the displacement of the contact points. As a result, the rotational resistance increases between the first friction faces 5A, 5A' of the bevel pinions and the second friction faces 72A, 72A' of the friction members. Accordingly, the bevel pinions 5, 5' are restricted from rotating, so that drive force is also transmitted to the heavier load bearing wheel.

As described above, since the projections 72E, 72E' formed in the friction bodies 72, 72' are received in the curved recesses 74B, 74B' formed in the intermediate members 74, 74', if the friction bodies 72, 72' rotate a predetermined angle, the projections 72E, 72E' of the friction members contact the side walls of the recesses 74B, 74B' of the intermediate members. Accordingly, the friction bodies can not rotate more than the predetermined angle, whereby it is possible to prevent the pressure members 73, 73' from being displaced from the respective cam grooves 72C, 72C'.

Thus, drive force can also be transmitted to the heavier load bearing wheel, and after the spinning wheel escapes from muddy ground or the like, the bevel pinions stop rotating. Since the pressure members 73, 73' are urged against the friction bodies 72, 72' by the biasing members 8, 8' via the intermediate members 74, 74', once the bevel pinions 5, 5' stop rotating, the pressure members 73, 73' go down to the deepest point of the cam grooves 72C, 72C' along the slanted surfaces 72D, 72D' (see FIG. 18A).

As is apparent from the forgoing, according to the differential gear assembly 71 of Embodiment 7, it is possible to automatically adjust the limited slip mechanism depending on the amount of external load applied on the ground wheels as well as to obtain the same effect as in the previous embodiments. Therefore, it is possible to run a vehicle more stably.

As noted above, the feature of Embodiment 7 resides in the fact that the frictional resistance between the bevel pinions and the friction bodies can be automatically adjusted by automatically adjusting the positions of the friction bodies depending on the amount of external load applied on the ground wheels, i.e., depending on the rotation of bevel pinions. Therefore, the invention as explained in this embodiment is not limited to the above described construction. For example, it is also possible to form a cam groove in the intermediate members and provide the friction bodies with the pressure members. Furthermore, instead of the cam grooves, it is possible to form a projection having a slanted surface which rises from the deepest point to the downstream of rotation of the friction bodies, so as to obtain the same effect as in the instant embodiment.

The instant embodiment has been described based on the differential gear assembly of the type of Embodiment 1, but apparently it can be applied to the other embodiments.

While the preferred embodiments have been illustrated and described, other changes and modifications may be made without deviating from the scope of the invention defined in the appended claims.

We claim:

1. A differential gear assembly comprising:
   a disc-shaped input member having a central portion, an outer portion around the central portion, and one or more open space portions formed between the central portion and the outer portion, the input member being provided with an input gear receiving a drive force at the edge of the outer portion;
   a pair of output shafts extending opposite each other along the axis of the input member and one end of each of the output shafts being loosely fitted and supported in a central bore formed in the central portion of the input member;
   a pair of side bevel gears each of which is fixedly attached near the end of each output shaft closer to the input member;
   one or more support shafts extending radially from the central portion into the open space portions of the input member;
   one or more bevel pinions rotatably supported on the one or more support shafts, respectively, to mesh with the pair of side bevel gears; and
   a friction mechanism located in at least one of said one or more open space portions that permits the bevel pinion to rotate with rotational resistance, said friction mechanism including
   (a) an end piece fixed on said one or more support shafts,
   (b) at least one friction member mounted on the support shaft between the bevel pinion and the end piece in an axially slidable manner, the friction member contacting a side wall of the open space portion formed on said outer portion of said input member so that the friction member cannot rotate relative to the support shaft, and
   (c) a biasing member disposed between the at least one friction member and the end piece to push the at least one friction member against the bevel pinion.

2. The differential gear assembly according to claim 1; wherein said one or more bevel pinions accompany at least one first friction plate mounted on the support shaft in an axially slidable manner but being unrotatable relative to the bevel pinions; and
   wherein said at least one friction member includes at least one second friction plate being in contact with said at least one first friction plate, the second friction plate being mounted on the support shaft in an axially slidable manner, wherein the second friction plate contacts a side wall of the open space portion so that the second friction plate cannot rotate relative to the support shaft.

3. The differential gear assembly according to claim 1, wherein the bevel pinion comprises a hole through which the support shaft passes, the hole being provided with a first friction face of female coned shape tapering toward the center of the input member, and
   wherein the friction member comprises a second friction face of male coned shape correspondingly tapering to frictionally engage the first friction face.

4. The differential gear assembly according to claim 1, wherein the bevel pinion comprises a first friction face on the opposite side to the center of the input member, the first friction face being of male coned shape tapering radially outwardly of the input member, and
   wherein the friction member has a second friction face of female coned shape correspondingly tapering to frictionally engage the first friction face.

5. The differential gear assembly according to claim 1, wherein the friction member comprises a flange contacting a side wall of the open space portion of the input member so that the friction member cannot rotate relative to the support shaft.

6. The differential gear assembly according to claim 1, wherein the end piece is detachably attached to the support shaft in a position-adjustable manner along the axis of the support shaft.

7. The differential gear assembly according to claim 6, wherein the end piece is a bolt or nut screwed into or to the support shaft, the side face of the bolt or nut contacting a side wall of the open space portion of the support shaft so as not to rotate relative to the input gear.

8. The differential gear assembly according to claim 1, wherein the biasing member is one or more belleville springs arranged along the axis of the support shaft.

9. The differential gear assembly according to claim 1, wherein the central portion and the outer portion of the input member are formed integrally, and wherein said one or more open space portions comprise one or more openings formed within the input member.

10. The differential gear assembly according to claim 1, wherein the at least one friction member comprises:
    an annular friction body rotatably fitted to the support shaft of the bevel pinion between the bevel pinion and the end piece in a slidable manner along the axis of the support shaft;
    an intermediate member fitted to the support shaft between the friction body and the end piece, the intermediate member being unrotatable relative to the input member but axially slidable along the axis of the bevel pinion whereby said biasing member disposed between the intermediate member and the end piece to push the friction body against the bevel pinion; and
    an adjusting mechanism disposed between the friction body and the intermediate member, the adjusting mechanism having i) a plurality of slanted surfaces formed on one of the friction body and the intermediate member and ii) a plurality of engaging members held by the other of said friction body and intermediate member on the side facing the slanted surfaces to engage the plurality of slanted surfaces, so that the engaging members rise up the slanted surfaces as the friction body rotates together with the bevel pinion to thereby press the friction body against the bevel pinion.

11. A differential gear assembly comprising:
    a disc-shaped input member having a central portion, an outer portion around the central portion, and one or more open space portions formed between the central portion and the outer portion, the input member being provided with an input gear receiving a drive force at the edge of the outer portion;

a pair of output shafts extending opposite each other along the axis of the input member and one end of each of the output shafts being loosely fitted and supported in a central bore formed in the central portion of the input member;

a pair of side bevel gears each of which is fixedly attached near the end of each output shaft closer to the input member;

one or more support shafts extending radially from the central portion into the open space portions of the input member;

one or more bevel pinions rotatably supported on the one or more support shafts, respectively, to mesh with the pair of side bevel gears; and a friction mechanism located in at least one of said one or more open space portions that permits the bevel pinion to rotate with rotational resistance;

wherein the input member comprises an opening connected to said one or more open space portions, wherein the central portion is detachably provided in the opening; and wherein said friction mechanism includes
(a) an end piece fixed on said one or more support shafts,
(b) at least one friction member mounted on the support shaft between the bevel pinion and the end piece in an axially slidable manner, the at least one friction member contacting a side wall of the open space portion formed on said outer portion of said input member so that the friction member cannot rotate relative to the support shaft, and
(c) a biasing member disposed between the at least one friction member and the end piece to push the at least one friction member against the bevel pinion.

* * * * *